(12) United States Patent
Sabev

(10) Patent No.: US 12,432,320 B1
(45) Date of Patent: Sep. 30, 2025

(54) ANONYMOUS REMOTE DEVICE CONTENT CAPTURE, SCHEDULING AND SECURE DELIVERY

(71) Applicant: HereVu LLC, San Jose, CA (US)

(72) Inventor: Anton Sabev, San Jose, CA (US)

(73) Assignee: HereVu LLC, San Jose, CA (US)

( * ) Notice: Subject to any disclaimer, the term of this patent is extended or adjusted under 35 U.S.C. 154(b) by 176 days.

(21) Appl. No.: 18/339,876

(22) Filed: Jun. 22, 2023

(51) Int. Cl.
*H04N 7/18* (2006.01)
*H04N 23/661* (2023.01)

(52) U.S. Cl.
CPC .......... *H04N 7/185* (2013.01); *H04N 23/661* (2023.01)

(58) Field of Classification Search
CPC ..................................................... H04N 7/185
See application file for complete search history.

(56) References Cited

U.S. PATENT DOCUMENTS

| | | | |
|---|---|---|---|
| 7,403,224 B2 | 7/2008 | Fuller et al. | |
| 8,666,222 B2 | 3/2014 | Black | |
| 8,854,465 B1 | 10/2014 | McIntyre | |
| 2004/0145660 A1 | 7/2004 | Kusaka | |
| 2016/0019415 A1 | 1/2016 | Ra et al. | |
| 2018/0234496 A1 | 8/2018 | Ratias et al. | |
| 2019/0227908 A1 | 7/2019 | Munafo et al. | |
| 2019/0272377 A1 | 9/2019 | Eckardt | |
| 2022/0201342 A1 | 6/2022 | Björkman | |
| 2023/0027329 A1 | 1/2023 | Durham et al. | |
| 2023/0056369 A1 | 2/2023 | Buck et al. | |
| 2023/0058282 A1 | 2/2023 | Hartz et al. | |
| 2023/0059826 A1 | 2/2023 | Racz et al. | |

*Primary Examiner* — Y Lee
(74) *Attorney, Agent, or Firm* — John Chandler

(57) ABSTRACT

Systems and methods for securely scheduling a remote content capture, and subsequently capturing, securing the captured content and securely transmitting the secured content in an atomic transaction from a second device to a first device. The systems and methods mediate and facilitate contracting for the same. Capture is facilitated without persistence of the captured content on the second device, and the captured content is secured and securely routed to the first device.

20 Claims, 11 Drawing Sheets

ANONYMOUS REMOTE DEVICE CONTENT CAPTURE, SCHEDULING AND SECURE DELIVERY

BACKGROUND OF THE INVENTION

Technical Field

The present invention generally relates to capture, encryption and transmission of content, such as an image or video, from a second device when requested from a first device and without the second device storing evidence of the same. That is, the content is captured, secured and made available to the first device by the second device passing the secured content to the first device by way of a network connection without persisting the content or revealing identifying user or account holder information. The respective device users remain unknown to each other.

Description of the Related Art

Various computer-based systems have been created to mediate a contract for a service between two users. A common example is a ride hailing service and system which establishes a relationship between the hailer and the service provider, each user operating a respective mobile device and a software application thereon. The ride hailer requests a ride and the service provider accepts the terms of a contract offered by the ride hailing system, typically owned and operated by a third party mediating company. The system handles the details of the transaction and connects the two persons through the use of the two respective devices, with the mediating company charging a fee for handling each system transaction. However, this type of system does not suit or adequately service every type of scenario between two users. In fact, certain varieties of these types of systems are detrimental to one or both users themselves and, up until now, fail to provide certain useful features.

Photo and video sharing systems are well known and use many types of mechanisms and components to provide a user of a software application with captured content.

A first type of system is a near-real time system whereby a user is able to watch an event while it is happening. In such system, there is some latency inherent to the system, normally in the range of 2 to 120 seconds. Typically, a time delay in video streaming depends partly on available network bandwidth, i.e., how fast data can be transmitted over the network between the two endpoint devices and partly on time delays introduced when the raw video stream is stored or buffered for encoding, streaming and the like. The encoding time may for example depend on the encoding scheme, as well as during any further transcoding required to distribute the stream to different clients or endpoints, storing of video segments by the client ("buffering") and finally decoding of the video stream and presenting the same on a display. This type of system nearly always involves a payment in exchange for receiving the content. The content delivery may or may not involve advertising during content delivery. Real-time content delivery is generally done between two parties.

A second type of photo and video sharing system involves three parties: a first user (capturer) who captures and uploads content, a second user (host) who stores and serves the captured content, and consuming users. Because the content is stored, the content can thereby remain available for years. Content producers are incentivized to produce content, reveal their identities and build a reputation and brand for the content and the content producer. Content producers can offer the content for free or monetize the content by, for example, a subscription fee, one-time payment, and advertising. There are many incentives for all of the parties of this second type of content system to know the identities of each other.

However, in some communities around the world, these types of content delivery systems and arrangements are not advantageous and may even be dangerous to any or all of the parties. Some content may be forbidden. Hosting of forbidden content may bring a financial penalty, seizure of the hosting equipment, or worse. Producing or consuming forbidden content may bring loss of reputation, a financial penalty, seizure of the equipment, or worse. The described invention (below) addresses the shortcomings of presently available content delivery systems and currently available content consuming systems.

DETAILED DESCRIPTION

Figure 1:
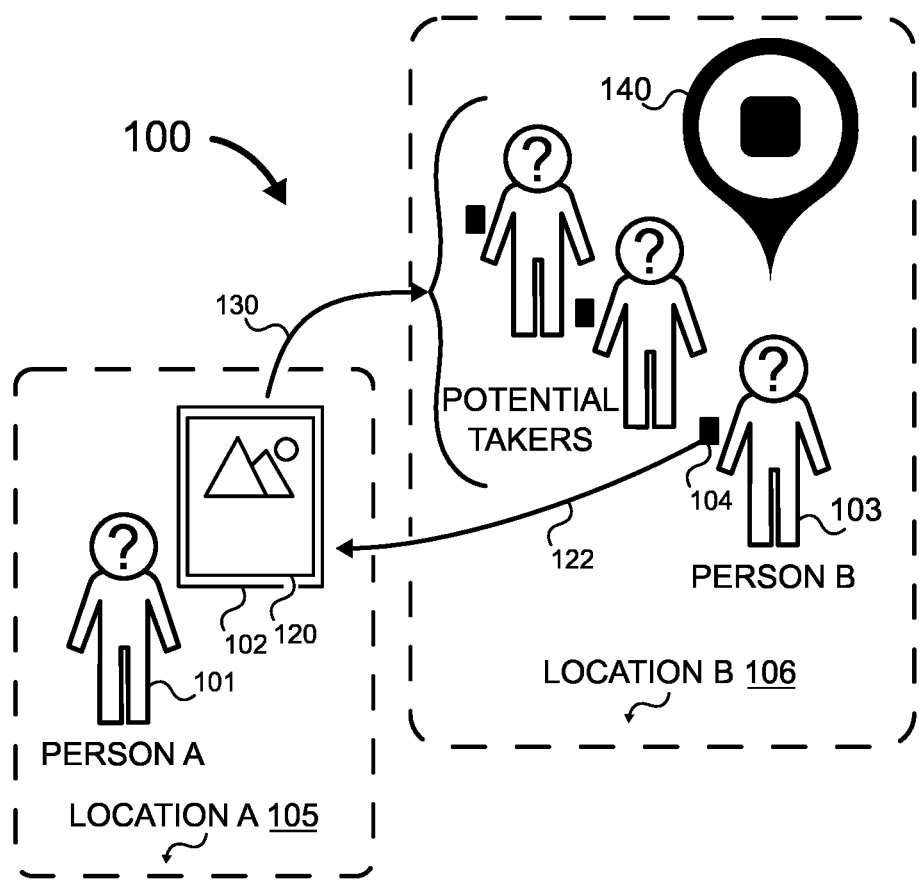
FIG. 1 is a block diagram of an embodiment of a system of devices for anonymous remote device content capture scheduling and anonymous, secure transmission of remotely captured content according to some embodiments.

Systems and methods, and aspects thereof, mediate and facilitate contracting for remote capture of content by a second device, scheduling of the same and delivery of the content. In certain embodiments, the scheduling and delivery of the content is anonymous. That is, the contracting parties are not known to each other before, during or after scheduling, capturing and delivery of content.

The request for a remote capture, and subsequent contract for the same, can originate from a first device or another device. Content capture can originate from the second device or another device in communication with the second device. In some embodiments, content is delivered from the second device to the first device. The secured content capture is scheduled and facilitated by routing a message from a first device to the second device. Alternatively, scheduling is performed by delivery of a message from an intermediate device to the second device. For example, the intermediate device is a system server that is asynchronously in communication with the first device and second device. By the mechanisms and combination of components described herein, the capture is facilitated without persistence of the captured content on the second device, and the captured content is secured and securely routed to the first device.

In this detailed description, several example scenarios are first described to explain the utility, benefits and aspects of the systems and methods using basic terms and concepts. Subsequently, the systems and methods are explained in reference to figures (drawings) that accompany this document.

Example Scenario 1

A first example scenario involves capture of mobile phone video or drone video from a distant and possibly dangerous location in certain locations within a geographic region. In this scenario, a hurricane is known to pass through and leave a certain region two days from the current time. A government agency wishes to request timely and anonymous capture of drone video to be able to reasonably assess local needs and clean-up efforts. At a first time, a government employee uses a first device to identify: (1) a geographic location (region), (2) a future time frame of interest and (3) a type of media to capture. In this scenario, the geographic region is a strip of land along the roads and regions around an electric substation for the morning after the estimated exit of the hurricane from the area. Through a web interface or mobile device and a software-based application operative thereon, the government employee enters the requisite details of one or more requests for video capture and submits the request or requests for fulfillment.

At a second time, available local residents having a mobile device (e.g., mobile phone) equipped with a camera as a peripheral component thereof, using an application on their mobile device accept one or more of the submitted requests to fulfill. The local resident does so by accessing a user interface or software-based application operative on the second device, viewing one or more available opportunities and activating at least one user interface element such as a button or replying with a "YES" by way of an SMS-based text message. The available opportunities displayed to a particular local resident on the second mobile device are selected by the system and provided in one of a variety of ways.

In a first embodiment, one or more particular opportunities are displayed for a first local resident based on: (1) the particular geographic location of the request matches a particular geographic region, and (2) where the local resident is currently located as known to the system. That is, the system presents a small number of available opportunities where the general geographic information of the requests lines up with one or more geographical identifiers associated with the particular mobile device local resident. Only after the local resident and content taker commits to (i.e., accepts) fulfillment of the request, at that point in time, the taker is able to see some or all of the particular details of the request.

In a second embodiment for displaying capture opportunities, one or more particular opportunities are displayed on the mobile device of the first local resident based on: (1) the particular geographic request location of the request matches a known particular geographic region and (2) the local resident browses a map or list of opportunities by geographic identifier and is searching to accept one or more opportunities by the geographic identifier. In this second embodiment, the geographic identifier may be by named neighborhood region, street name, postal (ZIP) code, voting district or some other somewhat large region in which the local resident is likely able to travel, desires to travel to, or can actually reach by the end time of a window of time in which the request is requested to be fulfilled. For example, the request is for at least a thirty-second video that must be captured within the next 30 minutes. The local resident is not able to see opportunities in an arbitrary region in the city, state or country where requests are pending since the system restricts viewing by an actual location of the mobile device of the each particular local resident.

In a third embodiment for displaying capture opportunities, one or more particular opportunities are displayed for the first local resident based on: (1) the particular geographic request location matches a known particular geographic region where the local resident has registered with the system and (2) the local resident is assigned by the system to see one, two or a few local opportunities that need fulfillment. The fulfillment in this third embodiment are first-come, first-serve. When a particular opportunity is reserved (accepted) or completed by another local resident (aka taker, user of the system), the opportunity is disappeared from the user interface of the local resident. In this third embodiment, the geographic identifier may be by named neighborhood region, street name, postal code, voting district or some other somewhat large region in which local resident is likely able to travel, desires to travel to, or can actually reach by the end time of a window of time in which the request is requested to be fulfilled. For example, the request is for at least a thirty-second video that must be captured within the next 30 minutes. Where a particular request can be fulfilled within a minute of being requested by the government employee, the opportunities listed in the local resident's user interface on the mobile device can be dynamically updated frequently.

In these embodiments, generally, where a local resident has accepted to complete the requested content capture, the particular opportunity is reserved for the local resident until the end of a capture window in which the requestor has identified. As a specific example, suppose the government employee has requested content capture from a particular geographic region within a 3 hour window starting from a current time. Once the local resident and taker accepts the particular opportunity, the opportunity is reserved until the end of the available time, the 3 hour window. The opportunity can then be fulfilled. If the end of the 3 hour window is reached without fulfillment, or if the local resident releases the opportunity back to the system, the unfulfilled opportunity may be relisted by the system at that point in time.

In this first scenario, optionally, the mobile device is used, and in communication, with an aerial drone or a tertiary device equipped with a camera. The mechanisms of reserving an opportunity are performed on the local resident's mobile device, and the captured content and related mechanisms are taken with the tertiary device. The captured content is routed through the mobile device and to the device of the government employee using the mechanisms further described herein as the second device is connected by the appropriate network connection(s) with the requesting device. Where present, the drone (e.g., lightweight flying device with a camera), captures video in memory and also has an application installed thereon and processes the video and routes the video to the mobile device of the taker. Then, the mobile device of the taker routes the captured content to the device operated by the government employee. In the case of using a drone, the video content is first transferred from the drone, prior to or after securing the video content, to the operator's mobile device (the second device). In this scenario, the mobile device of the local resident is a second, ground-based device such a mobile phone or satellite phone with a network connectivity.

On the second device, a software application, in memory, processes the captured video content, secures the captured content and routes the secured and captured content over the Internet or other network using one or more available and appropriate communication protocols to the first device. The second device does so without persisting the video content in either the tertiary device (e.g., drone) or the second device. In a preferred implementation, the second device transfers the secured and captured video content directly to the first device without pushing the content to an intermediate server from which the first device later in time requests and accepts a copy of the persistent content. That way, one advantage of this mechanism is the avoidance of expensive intermediate data warehousing of content.

Another advantage includes the avoidance of persisted content on either the drone or the second ground-based device because the content has been secured and routed directly to the first device for the benefit and consumption by the government and government employee. This advantage comes with several benefits based on two mechanisms of the system: encryption of captured content and no local storage of the captured content. The content is secured such as by encryption with a symmetric or asymmetric encryption key belonging to the government and government employee. Further, the captured content is transient on the mobile device of the local resident (taker).

As yet another advantage of these mechanisms, the local resident (and drone operator) is unable to access the captured content because the content is directly secured in memory after capture. If the drone or second device is inspected, no stored content would expose the operator as having captured video content from a particular geographic location. The government employee does not know or need to know the identity of the capturer or any identifying information of the capturing device.

Further, no artificial storage limit is implicated. The local resident, whether generating by drone or mobile device, is not tasked with separate steps subsequent to capturing of the video. The persistent storage of the device of the local resident is not consumed until a second, later-in-time and manual step of clearing particular files is performed. The overall system allows for substantially fewer steps compared to performing each of these steps manually. The particular mechanisms described herein and the overall process reduce the chances of failure of gathering the highly desired video content and getting the video content to where the captured video content can be put to best use.

In terms of particular technical steps, according to at least some embodiments of this first scenario, prior to routing the captured video to the first device, the captured content is processed as follows. The video content is embedded with certain information about the video content in a secure format. For example, the video content is embedded with geographic metadata of the location of capture (e.g., approximate or accurate-as-possible geographic coordinates). The video content is also embedded with chronographic information generated in relation to the internal clock (e.g., local time) of the second device and this chronographic information is at the start of, during or shortly after, the conclusion of the capture of the video content. This securing process ensures to the government employee (requestor) that the captured content is what was requested (within the parameters given in the original request) and was not altered by the operator of the drone or second device.

Other identifying information such as the native resolution of capture and yet other information also may be securely added to the video content before the video content is secured and packetized in preparation for sending it across the network available to both the second device and the first device.

In at least some embodiments, in terms of securing the captured video content, the captured video content is encrypted with an encryption key that is generated by either the first device or the second device for singular access by the government employee, the requestor-aka the operator of the first device. Both the government employee and the taker (operator of the second device) thereby are assured that the captured content has not been altered and assured that the captured content honestly reflects the objects and conditions observed at the location and time of the requested video capture.

This first scenario also illustrates that the particular sequence of events scheduling, capture and delivery can be performed without one or more previous or subsequent steps involving a payment or other reward for the local resident fulfilling the request for video content. However, payment or reward steps may be combined with the scheduling, capture and delivery steps explained herein. In this first scenario, the requestor (government employee) and the content capturer (local resident and taker) are unknown to each other and remain anonymous to each other.

A yet further benefit of this first scenario is the immense possibility of rapid capture of a substantial amount of valuable captured video content. The content can be captured by many takers (local residents). The government employees are then enabled within minutes instead of hours to take further actions based on observations that can be formed from viewing the captured content. In this scenario, the content capture is performed without any government employee driving through neighborhoods where trees and other debris may make travel dangerous. The government does not need to schedule or perform a flyover of particular locations. Fossil fuel consumption is eliminated or substantially reduced and pollution is dramatically reduced as the capture requests can go out quickly and capture can occur without the use of motorized vehicles-all within a matter of minutes. Thus, not only do these mechanisms have benefits and advantages for the device participants, there are substantial benefits for society as a whole.

Variations of this first scenario are many. For example, this system can be used between a first college student and a second college student who are both attending a same lecture but where the first student is sick or unable to attend a future-scheduled lecture. In this variation, the first student sends the system a request for an audio or video capture of the particular lecture and another student, who remains anonymous to the first student, captures the content and the content is automatically routed to the first student. That is, free of charge or for a fee, one of the students, who would ordinarily already be in the class, is able to capture the audio or video of the particular lecture for the benefit of the first student. The contents of the recording are accurately and securely delivered to the absent student.

As a second example variation, a scientist knows that a bird or whaling migration is or will be active starting at a future time and within a particular time window. The scientist wishes to capture (with or without pay) as many scenes and content as possible. The scientist posts one or more opportunities or capture requests, and multiple parties may accept the same or different (uniquely tracked) requests, and are reminded by text-message or on the mobile device at the appropriate time by the application to capture the remote content.

As a third variation of the first scenario, consider a law firm who learns that its Client has been involved in an accident and needs evidence for settlement negotiation and possible trial purposes. An accident can be a one-time event (e.g., an automobile crash) or an on-going event (e.g., a train crash or environmental disaster) with evolving states that cannot be reproduced or evaluated in the past. The law firm employee opens one or more requests to capture video, photos, drone coverage or environmental instrument readings of the particular scene as soon as possible after the accident or at hourly intervals after the incident. In system operation, the law firm opens up a single request for remote capture that can be fulfilled once, or opens a series of individual requests that each can be fulfilled once or fulfilled many times by the same person over time. The request can be fulfilled the same day, same hour, and also by several different people over the coming days to show the evolution of the accident scene, if needed, and also allows the law firm to capture the location conditions as close as possible in time to the actual event. In certain circumstances, accident participants and witnesses may be too busy and suffering from the effects of trauma to capture good quality video or other content. Thus, not only is relevant information captured, the captured content is done by those who are not distracted by the circumstances of the particular event.

Example Scenario 2

A second scenario involves capture and delivery of content from student activities to working parents or occupied parents. This second scenario illustrates further advantages of, and problems solved by, the systems and methods described herein. Parents are sometimes unable to leave work for participation or attendance at a school event. These parents would ordinarily be unable to observe their child involved in the school event which generally occurs during normal school hours. Thus, these parents have a scheduling conflict. In particular, these parents, during the school day, are unable to leave work, fight traffic to the school location, pass through school security, observe a short performance, and then make the return trip back to work. The whole effort is often very disruptive for these parents and employers. Instead, benefits for the parents, employers and environment are granted by using the techniques described herein. Parents are able to skip the steps of travel to and from a different geographical location. Using the techniques and components described herein, each parent can directly opt in and receive an audio or video capture of a particular event involving one student or a group of students. Each parent can directly receive a relevant captured content segment that involves their particular student. The captured event is time bracketed and geographically fenced by the system.

As a specific example, consider a parent or other interested party (e.g., guardian, grandparent) who, without this system, would be unable to attend a soloist musical recital of their child that is scheduled for 10:45 a.m. on a Tuesday. In terms of the technological components, prior in time to the event, a requestor elects through an electronic graphical interface of the system to participate and receive the content. Prior to the event, an electronic message from a participating parent's device is received by a device at the school with the necessary (student and event) information. The electronic message includes a security component that has been generated and locks the audio content or audio plus video content to the parent and the child in identity, time of the event and in geography as determined by or in relation to the capture device. That is, the remote capture is allowed if the parent has already opted into the system. Further, the remote capture is allowed when the parent has an identifier for the event and student, and has generated an encryption key that is then delivered to the school's device for encryption of the audio and video content for encrypted delivery to the particular parent. The parent thus makes a second, event-specific request for initiating and for actually enabling of capturing and sharing of the captured content. The inbound request from the parent for the event includes student-identifying information and the system verifies that the inbound request is allowed for the particular parent (and device), the particular event and for the particular student at the particular school. In this system, broadly speaking, strangers cannot request audio or video content from random school events. The particular mechanisms for securing requests are known to those in the relevant computing arts when combined with the information disclosed herein.

In this second scenario, the school is equipped with a network-connected device having the components of the invention. During the event, the content (audio-only or video and audio) is generated, processed according to one or more embodiments of the particular techniques described herein, and delivered directly to a parent's particular device-a device-to-device transfer. The content is securely encrypted (1) during capture of the school event, (2) in transit from the school-based device, and (3) at rest on the parent's device. The encryption is performed using a symmetric or asymmetric key belonging to the requesting parent. The encryption key is generated by the requesting device and delivered to the school-based device. Prior to the event, the communications between the various components are transferred asynchronously and the content is delivered synchronously during the event or shortly thereafter.

The benefits of this system are many, and particularly with respect to the electronic content itself. Parents, teachers, schools and school administrators are not hosting, and physically do not host, the content and thereby avoid copyright, right to publicity and right to privacy risks. These benefits are so significant that this outcome bears repeating-only the local storage of the requesting device is implicated in receiving and storing the captured content. Further, these same entities are not burdened with the ever-burgeoning cost of hosting the digital content itself or by a third party hosting provider; the costs of operation can be borne by the participants. Further, and more broadly, the parents avoid the energy, associated environmental pollution, and time consumption related to travel and attending the event. The parents are simultaneously able to participate and persist a recording of a child's performances for their own current and future personal records. The school is minimally burdened since the school administrator or school operator of the capture device only has to trigger the start and end of the session (through a graphical user interface) and much of the remainder of the system operates without further input or manual processing by the participants. Each parent is assured that each delivery is only accessible to that parent and not to all parents and not accessible to unauthorized participants. Unlike in the first scenario, in this second scenario, the requestor (participating parent) and the content capturer (school of the parent's child) are known to each other.

Finally, this second scenario illustrates that embodiments of the systems and methods can involve one or more monetary transactions. Parents, schools or both parents and schools may be involved financially in one of several possible ways. For example, parents may pay in one of a variety of ways. Parents pay a once-a-year subscription fee to participate in all of the available remote device content capture scheduling events, the here-view system. Alternatively, parents pay once per transaction for a particular event or to a school-sponsored club that offers use of the system. Alternatively, the school or school system financially may be involved in one of several ways. For example, a school may pay for the use of the system for the year, per event or even per transaction (with or without volume pricing) with invoicing and payment on a regular schedule (e.g., monthly). Yet a further option involves payment from one or both of the parent and school at the time of request through use of the system-a software-based or app-based purchase whereby the requesting device owner (parent) and capture device owner (school) pay at the time of downloading and installing a software-based application on their respective devices.

Example Scenario 3

A third scenario involves capture and delivery of content for general media purposes. This third scenario illustrates further advantages of, and problems solved by, the systems and methods described herein. In this scenario, a media producer (requestor) would like fresh and currently-not-taken photos to accompany a text-based article currently under development and which is scheduled for publication in one or two days hence. An employee of the media producer puts out a request for, for example, photos of a full moon rising over a remote location of a mountain that is mentioned in the text-based article. Instead of going to a stock photo service and browsing, selecting and purchasing use of historical content, the employee creates a request for the particular content. A local photographer (taker), using a software-based, website-based or application-based user interface sees the opportunity and accepts the opportunity to fulfill the request. The request is thereby reserved and associated with the taker.

The taker travels outside of network access to a remote location within the time window associated with the content request to prepare for capture of the content. The local photographer then uses her photographic experience and best judgment to frame and capture several photos that would satisfy the request. The captures are performed with a software application as described herein so that the technical features of the technology described herein can be implemented and the captures are not performed by other known means. The captured photos are encrypted and persisted temporarily on the capturing device. The taker also may take advantage of the travel and photo opportunity by capturing different photos for her own separate use but those photos are not part of the captured content as described herein.

Once the taker and her device reestablish network connectivity, the system received notification that at least one photo, irrespective of quality, has been captured and the taker receives a minimum fee associated with at least minimally fulfilling the remote capture opportunity. The minimum fee is paid by the requestor.

Further, the application operative on the capturing device shares a representation of one or more of the photos to the requestor via the requestor's device. For example, the taker's application routes one or more thumbnail-sized representations of the captured content (separately encrypted and securely transmitted) to the requestor's device. The requestor interacts with application and system and agrees that the captured content is of sufficiently accurate content to continue the transaction. The taker's device receives a message from the system (e.g., from the requestor's device) and is thereby triggered to deliver over the available network one or more of the captured photos to the requestor's device. The taker's device may make the delivery without further notice to the taker herself. Depending on the various embodiments, the delivery may be done with or without delivery of thumbnails and with or without approval to continue the transaction. The delivery is thereby performed after the content is captured and after the time that network connectivity is re-established between a requesting device and a capturing device and may be done with or without intermediate steps such as approval of thumbnails or short snippets of captured video of content taken.

This third scenario shows that network connectivity during the actual event of capturing content is not necessary but desirable. When connectivity is continuous, the capture and encryption is all in memory while the capturing device is active and can route the content directly over the network. When network connectivity is disrupted, such as travel into the mountains for photo capturing, the capturing device may need to enter a state of low power. In these instances, captured content is encrypted and persisted in temporary storage in the capturing device until network is reestablished. In this third scenario, the taker's device has encrypted content but the taker is unable to view the content since the taker does not have access to the passphrase of the encryption key used to encrypt the remotely captured content. As shown in this third scenario, the content continues to be secured for use only by the requestor. The legal rights to the content can be traced to and remain with the requestor at all times of the steps of this third scenario. In at least some variations of this scenario, in response to successful delivery of remotely captured content, payment from the requestor is thereby released to the taker in exchange for service of capturing the content. In certain embodiments, the payment amount is known to the taker at the time of accepting the request. In other embodiments, the payment amount is set by either the requestor or taker closer in time to the capture time or after the time of acceptance of the request.

Once the transaction and delivery of the captured content is completed, all captured content associated with the opportunity and capture is securely erased from the device or devices of the taker programmatically by the software-based application operative on the device or devices. The content requestor's devices retain their copy of the encrypted content until the requestor manually and actively takes the step to mark the content for deletion through the software-based application on the requesting device. Prior to deletion, the requestor is then able to export and incorporate an unencrypted version of the content into the medium in which the requestor is working (e.g., into a page layout software).

System and System Components

As further described below in relation to the accompanying figures, a network-operative service facilitates communication between numerous user devices, which collectively provide a platform in which user devices serve as both audio and video sources and devices through which offerings of a content capturing service are implemented. In this regard, mobile computing devices and other user-operated devices may have a role as a content capture source, from which the content capture service can gather the content and implement content capture functionality more effectively than previously possible. In some examples described herein, the role may be implemented through an application that runs on each respective mobile computing device, for the purpose of capturing audio or video content for, and/or receiving information from, the content capture service. Embodiments are implemented in the form of computer-programs, or a computer-based medium capable of carrying and operating such a program. The embodiments include user interfaces (UIs) and UI elements through which the users interact with the software-based components and operate the hardware components operative in the described system. Description with reference to the accompanying figures.

FIG. 1 is a block diagram of an embodiment of a system 100 of devices for anonymous remote device content capture scheduling and anonymous, secure transmission of remotely captured content. The system 100 is shown in a simplified format in FIG. 1 and in more detail in FIG. 2. FIG. 1 illustrates an example system 100 to provide information from a requesting device, such as a first device 102, and to deliver the information to a fulfillment or "taking" device, such as one of the second devices 104. The example system 100 routes secured content 122 from the second device 104 to the first device 102. Content captured by the second device 104 is then only available on the first device 102 and not on the second device 104. Content 120 is not available on or to the second device 104. Content 120 is not available in transit from the second device 104 to the first device 102 because the content 120 is passed in the form of secured content 122.

Generally, the first device 102 and the second device 104 are operative and participate in a content capturing service as further described herein. The first device 102 is at a first location 105 labeled "LOCATION A". The second devices are associated with or located in a second location 106 labeled "LOCATION B". The first and second locations 105, 106 can be near or far from one another. For description purposes, and in most cases, these locations are remote from each other such that the first device 102 and the second device 104 each require a respective network connection and intervening devices (not illustrated) in order to communicate with each other.

As illustrated in FIG. 1, the system 100 involves a first person 101 (labeled "PERSON A") sending or triggering creation and delivery of a request for content capture from one of the second devices 104 which are available for content capture at a designated capture location 140. The first person 101 remains anonymous to the potential takers and the actual taker (for example, the taker 103 labeled "PERSON B"). The potential takers and the actual content taker remain anonymous to the first person 101. The first person desires content from the designated capture location 140 which has been chosen by the first person 101. The designated capture location 140, such as in the form of a first set of map coordinates, is communicated with the system 100 or in a message 130 to one or more of the second devices 104. Any of the potential takers can agree to be the actual taker of the content. The request for content capture is delivered to each of the second devices 104. Once a particular taker 103 has accepted the request to capture content, a more accurate set of location information—a more precise geographic location within the designated capture location 140—is delivered to, or made available to, the second device 104 and thus made known to the taker 103 who has accepted a contract (agreed) to capture the content 120 for the first person 101.

The designated capture location 140, prior to being accepted by one of the takers 103, is represented as a type of map pin that is used in user interfaces (not shown in FIG. 1; UI's and a map are shown in other figures). The designated capture location 140 is represented by the map pin which has a particular squircle shape generally in the middle of a hollow circle to communicate that a remote capture request, and particularly one of types of requests described herein, is available at a particular location in or near location B 106.

Broadly, the system 100 involves delivery of one or more messages to the second devices 104 including a message 130 to one or more of the second (taker) devices 104. The message 130 enables the taking device 104 to secure the captured content at the time the content is captured by the second (taking) device 104 and thereby the taking device 104 generates a secured content 122 using information in the message 130. The secured content 122 is delivered to the first device 102 and the actual content 120 is available to the first person 102, the content requestor, on the first device 102 with a software-based application and user interface thereon.

In operation, one of the potential takers, for example, the taker 103 labeled "PERSON B", using her (second) device 104, captures the content at the designed capture location 140 and routes the secured content 122 to the first device 102 over a set of network equipment (not illustrated in FIG. 1). That is, certain aspects of the system 100 are implemented by and operated on a single computing device and/or computing system, or on a large number and variety of computing devices and computing systems that operate together to cause the secured captured content 122 to reach a device 102 available to the first person 101 (e.g., over cellular networks, wide area networks). In the system 100, there is a requesting device 102 and a taking device 104 and the terms "requestor" and "taker" refer to these respective devices: the first device 102 and the second device 104, respectively.

Figure 2:
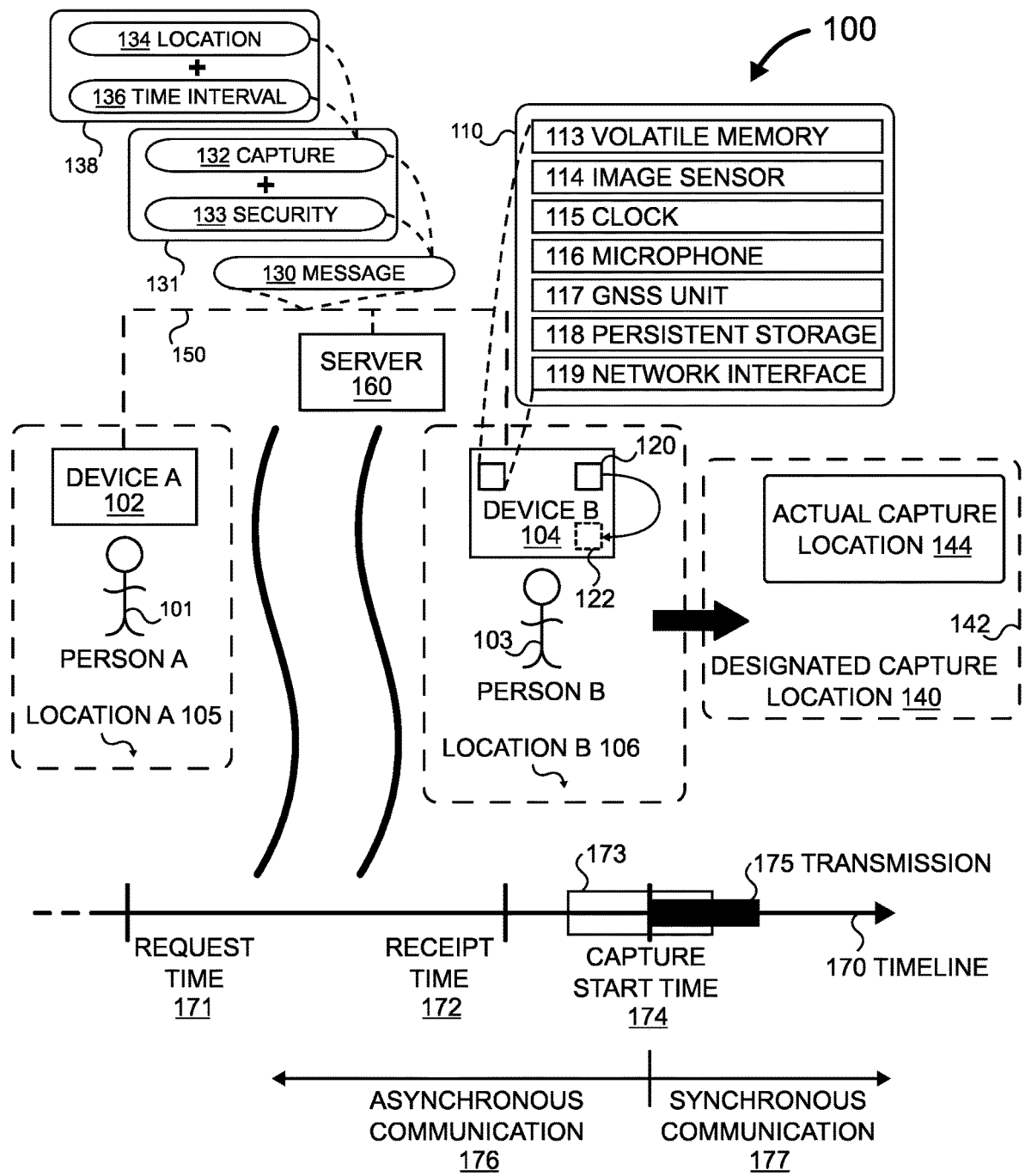
FIG. 2 is a block diagram of an embodiment of a system of devices for anonymous remote device content capture scheduling and anonymous, secure transmission of remotely captured content according to some embodiments.

FIG. 2 is a block diagram of an embodiment of the system 100 of devices for remote device content capture scheduling and secure transmission of remotely captured content. FIG. 2 illustrates the example system 100 with more detail than shown in FIG. 1. The system 100 shows how to provide information from the requesting device to the fulfillment or "taking" device in connection with a anonymous remote content scheduling and anonymous, remote content capture service.

In FIG. 1 and FIG. 2, the requesting device and taking device are described as communicating with each other. In operation, according to at least some embodiments and currently available network equipment, these devices communicate with each other indirectly with one, several or many devices and components interposed therebetween. The intervening equipment facilitate the communication between the requesting device and the taking device. Those intermediate devices are not illustrated in FIG. 1 and FIG. 2, and are generally represented by a network 150 and a server 160, but are present in the system 100 and, in most embodiments, are not under the direct control of the requesting device and the taking device and thereby are not illustrated for sake of clarity in describing and illustrating the features of the embodiments of the systems such as the system 100 of FIG. 1 and FIG. 2.

With reference to FIG. 2, the system 100 includes the first device 102 referred to herein and in some figures as Device A and a second device 104 referred to herein and in some figures as Device B. The first device 102 belongs to and is operated by the first person 101 referred to herein as Person A and content requestor. The second device 104 belongs to and is operated by a second person 103 referred to herein as Person B and a content taker who fulfills one or more requests. The first device 102 is in or near the first location 105 referred to as Location A. The second device 104 is in or near a second location 106 referred to as Location B. The first device 102 is at least initially in asynchronous and indirect communication across a large or wide network 150 with the second device 104. In certain embodiments, depending on the configurations of the devices 102, 104, these first and second devices 102, 104 are in connection with a server 160, as needed, as would be understood by those in the mobile device and networking arts. The asynchronous and indirect communication of the wide network 150 is communicated to an observer and illustrated in FIG. 2 as a dashed line. The network 150 can be said to connect the first and second devices 102, 104 and may take one or more forms depending on which protocols are used or active at a given time (e.g., cellular network, wireless network complying with one of the IEEE 802.11 family of standards) in the system 100.

Each of the devices 102, 104 includes components: for example, touch-enabled display screens, batteries (power source), memory, persistent storage, operating system, user applications operating thereon and the like as are known and available in the relevant computer arts. As shown in FIG. 2, for sake of explanation, the second device 104 has certain components or peripherals 110 including one or more of each of the following: a volatile memory 113, an image sensor 114, a device hardware clock 115 (or combination of software and hardware components within the device 104), a microphone 116, a global navigation satellite system (GNSS) receiver or transmitter 117, persistent storage 118 and network interface 119 through which the second device 104 communicates with and participates in the network 150. The first device 102 may have these same components but are not illustrated for sake of simplicity of illustration only.

An example of an image sensor 114 is a charge-coupled device (CCD) or complementary metal oxide semiconductor (CMOS) component or group of peripherals represented as image sensor 114 that capture and post-process the image captures and that are capable of generating a visually perceived component of the content 120. Generally, the image sensor 114 represents one or more components that convert light into electrical charges. Other peripherals 110 that are not shown but are present in the devices 102, 104 include a central processing unit (CPU) and a touch-interactive display. These peripherals 110 are part of, associated with, physically external to, or within the second device 104. The second device 104 captures content 120 and creates secured content 122 before sending the secured content 122 on the network 150.

During operation, taker (Person B) 103 travels to and across a boundary 142 associated with a designated capture location 140 that may be the same as or different from the second location 106 (Location B). That is, the designated capture location 140 may be an area that is greater than or at least includes the second location 106 at the time that the second device 104 receives an inbound message 130. The boundary 142 is, for example, a geographically identifiable and detectable geofenced area corresponding to the designated capture location 140. The taker 103 may make a judgment call as to when it is safe and appropriate to begin capture of content 120. Thus, an actual capture location 144 may be different in size or actual location in terms of the designated captured location 140 and its boundary 142. In most embodiments, the actual capture location 144 is within the boundary 142 and designated capture location 140.

The message 130 may be formed by the first device 102, or a combination of the first device 102 and the server 160, or both the first device 102 and the server 160 and components thereof. The message 130 includes operative details for the remote capture opportunity within a designated capture time interval (CTI) 173 (shown on a timeline 170). In terms of chronological sequence, at a first time, a request is made at a request (generation) time 171 and is indicated on the timeline 170. The second device 104 receives the message 130 at a receipt time 172.

The CTI 173 may be the same as or include the receipt time 172. That is, the opportunity to capture content may have already started and the second person 103 can proceed to cause remote capture immediately upon receiving the message 130. That is, the request of the message 130 may be for "as soon as possible" in terms of the timeline 170. Alternatively, the second person 103 may have to wait until a later start time associated with the request. An actual capture start time must be within the CTI 173 and, while not illustrated, the receipt time 172 may be within the CTI 173. Upon capturing audio or video or other content, transmission 175 may start or occur within the CTI 173. Generally, in many examples and scenarios of operation, the devices 102, 104 are in asynchronous communication 176 prior to the capture start time 174 and in synchronous communication 177 when content transmission or delivery occurs when network connectivity is available to the devices 102, 104.

Turning to the content of the message 130, the message 130 includes capture information 131: a capture instruction 132 and a security component 133. The capture instruction 132 includes a capture location 134 and a time interval 136 corresponding to the CTI 173. The instructions 138 are a combination of the capture location 134 and the time interval 136. The capture location 134 includes at least one boundary 142 or a set of boundaries so that the GNSS unit 117 may be used by the second device 104 to determine if a location boundary 142 is crossed for enabling the second device and its user interface (not shown in FIG. 2) to allow content 120 capture. That is, the second person 103 and the second device 104 must satisfy both a location requirement and a time requirement prior to initiating remote content capture. The time interval 136 may be used by the second device 104 for scheduling purposes. The capture location 134 may be used by the second device 104 for determining the scheduling and enablement of remote capture of the content 120 and corresponding secured content 122.

That is, the instructions 138 determine if the second device 104 is appropriately shown or notified of the content capture opportunity at the designated capture location 140 and for the particular CTI 173. The system 100 may calculate or determine that the opportunity is too remote in time, in location, or in both time and location and thus may avoid delivery of the message 130 to the second device 104 if the second device 104 is too far away from the opportunity. The system 100 may take into account historical location and timing behavior of the second device 104 relative to, for example, typical locations of the second device 104, travel speeds, time of day, activity history, and so forth for the second device 104 and thus the system 100 may determine the second device 104 is not qualified to receive the message. Or, the system 100 may deliver the message 130 to the second device 104 and leave it to the volition and judgment of the taker 103 to opt into fulfillment of the opportunity. Other aspects of the system 100 are discussed in relation to other figures.

Figure 3:
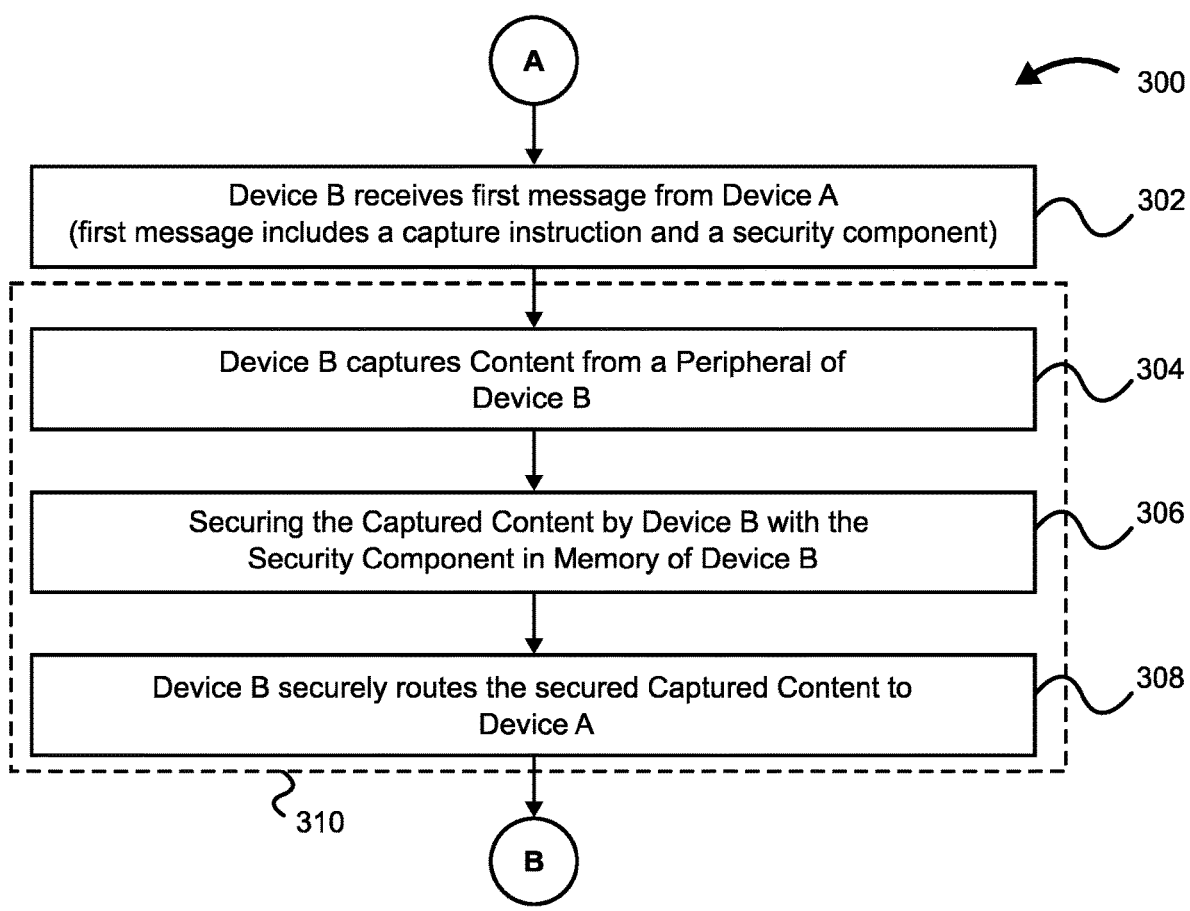
FIG. 3 is a block diagram of a method for remote device content capture scheduling and secure transmission of remotely captured content according to some embodiments.

FIG. 3 is a block diagram of a method 300 for remote device content capture scheduling and secure transmission of remotely captured content. In certain embodiments, depending on certain functionality of the system 100 (or other systems described herein or illustrated), other non-illustrated steps of the method 300 represented by "A" and "B" are part of the method 300 shown. While "A" is shown before steps 302, 304, 306 and 308, and "B" is shown after the same steps, the steps "A" and "B" may be performed during, before or after the steps and sub-steps represented by steps 302, 304, 306 and 308. At step 302, the method 300 includes Device B 104 receiving the message 130 such as receiving at Device B 104 the message 130 from Device A 102. The message 130 includes: a capture instruction and a security component, such as the capture instruction 132 and the security component 133, respectively. When environmental and photographic conditions are appropriate, at step 304, the Device B 104 captures content from a peripheral such as one of the peripherals 110 of the Device B 104 or from a drone in communication with Device B 104 (the drone not illustrated in FIGS. 1 and 2). The content 120 is captured to a volatile memory 113 of the second device 104.

At step 306, the captured content is secured by the Device B 104 using at least a part of the security component 133 or by information derived from a part of the security component 133. In a specific example, the security component 133 includes a symmetric key for symmetric key encryption of the content 120 to yield the secured content 122. A secret for the symmetric key is only known by Person A (requestor) 101 or stored or entered in the first device 102 (Device A). The use of symmetric key encryption at this point in the method 300 has some benefits including: (1) having a relatively small key size thereby keeping the message 130 as small as possible and thereby reducing memory usage and (2) enabling faster transmission between the Device A 102 and Device B 104. Asymmetric encryption also can be used whereby a public key from Device A 102 and belonging to Person A 101 is part of the security component 133.

At step 308, Device B 104 securely routes the secured captured content 122 to the first device 102 (Device A). The set of steps 304, 306 and 308 are atomically grouped and shown as a single step 310 and thereby occur together, without interruption in sequence, and packet by packet or portion by portion, where possible, and with no input from the Person B 103, or at least with as little further input or activity by Person B 103 and Device B 104 as possible. For example, Person B 103 may need to select a user interface (UI) element on the display of the second device 104 to "stop recording" so that the captured content has a human-selected end of content, end of capture time, or endpoint in time. In other embodiments, once a minimum time duration of the content 120 (when specified in the message 130 such as part of the capture instruction 132), Device B 104 starts to securely route the secured captured content 122 (at step 308) to Device A, or Device B has already started transmission to Device A and securely routes the secured content 122, in terms of a time-based quantity, only up to the requested minimum time duration and then the capturing and transmission stops without any user input at Device B 104.

The steps 304, 306 and 308 form an atomic set 310 of steps. There are various advantages of the atomic nature of the steps 304, 306 and 308. For example, one advantage is that the capture and securing processes cannot be corrupted or interrupted by the Person B 103 or by a second process operative on Device B 104. In certain embodiments the atomic set 310 of steps are performed by a single process operative on the second device 104. That is, the atomic set 310 of steps is an automated, non-interruptible process operative in the second device 104. As another advantage, Person B does not have to inspect, crop, transform, select for transmission, or perform any other step during the atomic set 310 of steps. While not shown as its own individual step in the method 300, and according to at least some embodiments for atomicity of the set 310, at step 308, the secure routing from Device B 104 to Device A 102 includes confirming the availability of a working network connection between the second device 104 and the first device 102 where synchronous transfer can occur between the second Device B 104 and the first Device A 102. In other embodiments, securely routing of the secured captured content includes establishing a virtual private network (VPN) tunnel or connection between Device B 104 and Device A 102. the VPN may be established by a same security component or a second security component (e.g., encryption key) that is generated by either the first device 102 or the second device 104 for purpose of the particular network transfer of the secured and captured content 122. As an example, a site-to-site VPN is established between Device B 104 and Device A 102 and the Internet Protocol Security (Ipsec) (a standards-based security protocol) is used to securely deliver the secured captured content 122 from Device B 104 to Device A 102. This mechanism of transfer has the advantages of availability, integrity, and confidentiality of the connection between Device B 104 and Device A 102.

Figure 4:
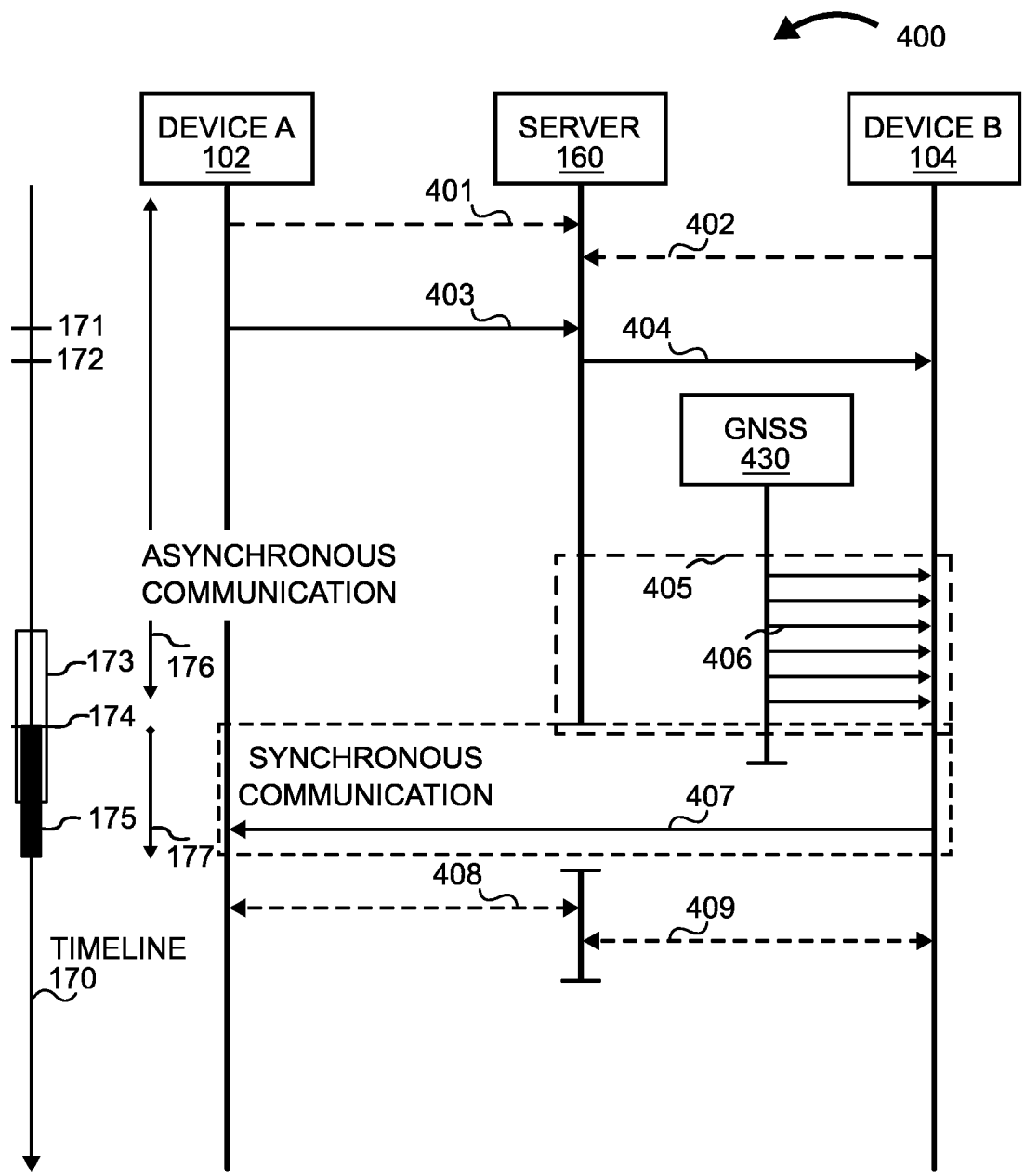
FIG. 4 is a block diagram of an embodiment of a system of devices for remote device content capture scheduling and secure transmission of remotely captured content according to some embodiments.

FIG. 4 is a block diagram of an embodiment of a system 400 of devices for remote device content capture scheduling and secure transmission of remotely captured content. The system 400 is shown next to the timeline 170 whereby communications between the various devices are shown relative to each other with the understanding that the timeline 170 and times thereon are not drawn to scale and distances between times are not proportionate. The system 400 includes the first device 102, the second device 104, the server 160 and a set of GNSS devices 430 which transmit respective signals to the devices including the second device 104.

In time sequence, the system 400 operates by the first device 102 (Device A) registering with one or more components operative on the server 160 represented by a first transmission 401 whereby certain information in or associated with the first transmission 401 about either a user account for the requestor 101 (Person A) or the first device 102 is registered with the system 400. Such registration allows the requestor 101 to create a request for content in the system 400. Similarly, a second transmission 402 originating from the second device 104 includes certain information about either a (second) user account for the taker 103 (Person B) or the second (content capture) device 104 (Device B). This step is a registration step with the system 400 for the taker. Alternatively, in at least some embodiments, these transmissions 401, 402 are distributed in a peer-to-peer fashion between the two devices 102, 104 and no server 160 is needed. In certain embodiments, these transmissions 401, 402 are represented by step "A" in the method 300 shown in FIG. 3. While these transmissions 401 and 402 are shown uni-directionally pointing to the server 160, these transmissions may involve more than one step and may involve communications sent to and from the server 160. These transmissions 401 and 402, in at least some embodiments, include network-related location information whereby the system 400 is able to keep track of a current location of each of the first and second devices 102, 104 (e.g., IP address for Device A and Device B, cellular locations for Device A and Device B).

In the system 400, Device A 102 sends a transmission 403 to the server 160. The server 160 uses the contents of the transmission 403 to create the message 130 for Device B 104 and a transmission 404 represents some or all of the message 130 delivered to Device B 104. Device B 104 is now primed for content capture and transmission to Device A 102 as described in relation to other figures (e.g., FIGS. 1-3). That is, at this point, the requestor has created a remote content capture request and the taker (second user) has accepted the request. On the timeline 170, the transmissions 403, 404 are performed at the respective request time 171 and receipt time 172. Alternatively, transmissions 403, 404 are distributed in a peer-to-peer fashion between the two devices 102, 104 without interaction with the server 160 and thereby the requestor and taker devices communicate with each other. The transmissions 401-404 can occur asynchronously 176.

Referring again to FIG. 4, when the taker (Person B) 103 (not illustrated in FIG. 4) is prepared to seek and fulfill a content capture opportunity, the second device 104 (Device B) receives, interprets and determines a location based on receipt of one or more GNSS messages 406 from the set of GNSS devices 430 over time. That is, Device B and applications and GNSS-operative peripherals therein, can remain in a powered down state until an appropriate location and time for content capture. Then, when the second device 104 is proximate in location and time for the content capture event, the second device 104 can detect crossing a geographic boundary 405 such as the boundary 142 associated with the designated capture location 140 (see FIG. 1).

In some embodiments, and to account for latency of the system and its components, the geographic boundary 405 may be slightly outside of the actual boundary 142 whereby the first and second devices 102, 104 can be given a bit of extra time and can thereby take pre-programmed steps to be active and ready for a synchronous communication 407 (during a synchronous time interval; see synchronous communication 177) between the second device 104 (Device B) to the first device 102 (Device A). In certain embodiments, the geographic boundary is inside of the actual boundary 142.

In operation the second device 104, uses its GNSS unit 117 and one or more first GNSS messages 406 to synchronize the device clock 115 and to at least trilaterate a rough position of the second device 104. Each of the set of GNSS devices 430 send information (messages 406) about their respective onboard times, their position (ephemeris) and error corrections, which the second device 104 uses to determine a position and a time. In some embodiments, once location for the second device 104 is determined within a predetermined minimum initial accuracy, the second device 104 continues to detect, receive and use GNSS messages 406 and the second device 104 continues to generate pseudoranges, Doppler and noise values and thereby more accurately pinpoints the location of the second device 104 aiding in determination of location with respect to the boundary 405. In other embodiments, the second device 104 only need successfully detect a single time crossing the boundary 142. At that point in time, the second device 104 is activated and thereby given permission to remotely capture content for the first device 102.

When conditions are correct for content capture, content capture starts to occur in response to activation of capture via a UI element by the taker. When secured content begins to accumulate in memory of the second device 104 (at capture time 174), the secure synchronous communication 407 occurs. Transmission 175 occurs until the secured captured content 122 is completely transferred to Device A 102.

In certain embodiments, upon completion of transmission 175, certain post-capture communications 408, 409 occur. For example, a communication message 408 is sent from the first device 102 to the server 160 (or to the second device 104) whereby the first device 102 confirms successful and complete delivery of secured content to the first device 102 has occurred. This communication 408 may trigger the release of a payment or other type of transaction for the benefit of Person B or user associated with the second device 104. For example, the requestor provides a rating for the remote capture request. As another example, for communication 409, the taker provide a rating to the requesting opportunity. The identities of the respective requestor and taker are not shared with each other and the ratings belong to the request and capture event and not to any user account at the server 160. In other embodiments, the users 101, 103 may provide ratings for the capture and experience in the respective post-capture communications 408, 409 so that the users 101, 103 may have updated user profiles in the system 400. In certain embodiments, increased accumulation of successful remote captures and high (positive) ratings allows the taker to qualify for a different tier of capture opportunities. For example, the taker may qualify in the system 100, 400 for higher paying opportunities or more complex opportunities where captures are for a longer duration or of a different type of remote capture (video captures instead of still image captures, night captures instead of daytime only captures).

In certain embodiments, the second post-capture communication 409 from the second device 104 to either the server 160 or the first device 102 includes information about the timing and geographic location (or locations over time) of the second device 104 during capture. In certain of these embodiments, other information is included in the second post-capture communication 409 including orientation of the second device 104 relative to actual or magnetic north, altitude (above ground) of the second device 104, light conditions during content capture, and so forth. One such information is an orientation (e.g., landscape, portrait) of the capturing device 104. The conditions during content capture may be evaluated programmatically at either the server 160 or the first device 102 against a set of pre-established quality metrics for the desired or requested content so that the first user 101 and the first device 102 have notification that a metric of the quality of capture has been met.

Figure 5:
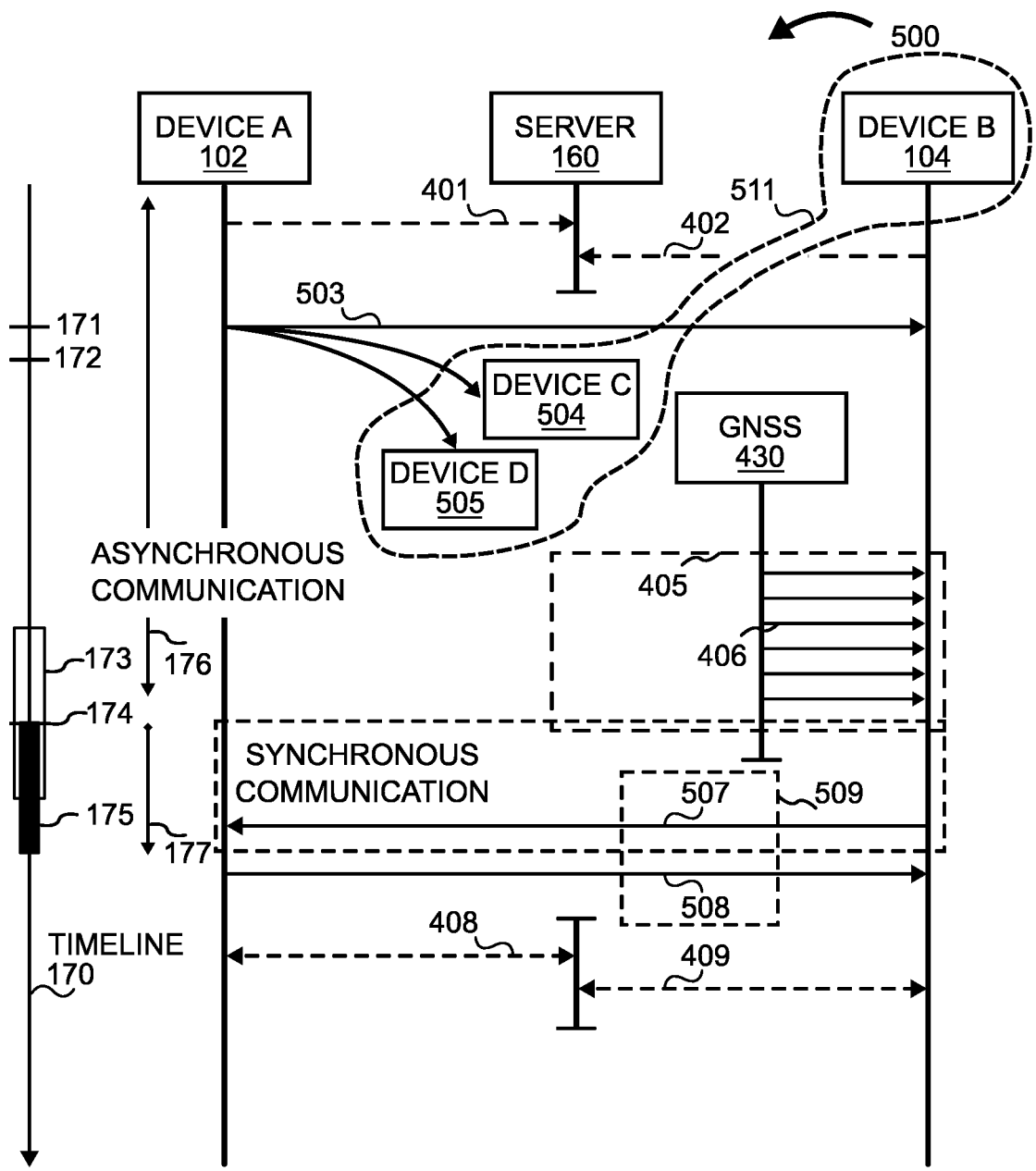
FIG. 5 is a block diagram of an embodiment of a system for remote device content capture scheduling and secure transmission of remotely captured content from multiple content capturing devices according to some embodiments.

FIG. 5 is a block diagram of an embodiment of a system 500 for remote device content capture scheduling and secure transmission of remotely captured content from multiple content capturing devices 104, 504, 505. The system 500 is shown next to the timeline 170 whereby communications between the various devices are shown relative to each other with the understanding that the timeline 170 and times thereon are not drawn to scale and distances between times are not proportionate. The system 500 includes the first device 102, the second device 104, the server 160 and a set of GNSS devices 430. The system also includes additional "second" or alternative (content capturing) devices 504, 505 (Device C and Device D, respectively). Broadly speaking, the system 500 and the server 160 serve to create a swarm 511 of participating devices 102, 104, 404, 405 so that the system operates with and allows for more direct, peer-to-peer, communications between the respective devices with less or no participation of the server 160 for transmissions between the respective devices.

In time sequence, the system 500 similarly operates as in the system 400 by the first device 102 (Device A) registering with one or more components operative on the server 160 represented by a first transmission 401 whereby certain information in or associated with the first transmission 401 about either a user account for the requestor 101 (Person A) or the first device 102 is registered with the system 400. The second transmission 402 originating from the second device 104 includes certain information about either a user account for the taker 103 (Person B) or the second (content capture) device 104 (Device B) for registration with the system 500. While not shown, each of the other second devices 404, 405 have similar transmissions 402 to register with the system 500 or to join to the swarm 411 of second devices 104, 504, 505 that are available geographically to perform a remote content capture or, in alternative parlance, fulfill a remote content capture opportunity.

In the system 500, Device A 102 (from the first user 101) sends a transmission 503 to one or more of the second devices 104, 504 and 505. The transmission 503 includes or otherwise has the required information—the message 130—for enabling the second devices 104, 504 and 505 to perform the remote content capture. In some embodiments of the system 500, a first-in-time device that fulfills the request for remote content satisfies the request and the request for content is fulfilled and the request is subsequently de-activated from the system 500. In other embodiments, all or each of the second devices 104, 504 and 505 captures and provides remote content capture and all or each of said devices 104, 504 and 505 securely routes secured content to Device A. In certain embodiments, the first user (not illustrated) pays for each content delivered to the first device 102. In other embodiments, the first user pays for the first-to-arrive content and subsequently captured content from other users is not delivered or is not compensated. In yet other embodiments, subsequently delivered content is paid at a reduced value or rate per minute (for video) or per item (for photos) to give an incentive for takers to be the first-to-deliver the requested content from the requestor. For the avoidance of doubt, while not shown for clarity, each device 104, 504 and 505 routes the content via a transmission 507 to Device A 102 and Device A 102 thereby has, for example, three (3) successful and different remote content captures at the end of the timeline 170, or at least three (3) communications from the respective devices 104, 504 and 505.

On the timeline 170, the transmissions 503 are performed at a same or different respective request time 171 and the devices 104, 504 and 505 receive the transmission at its own receipt time 172.

When takers (not illustrated in FIG. 5) associated with respective Devices B, C and D are prepared to seek content capture, the second Devices B, C and D each receive, interpret and determine a location based on receipt of GNSS messages 406 from the set of GNSS devices 430 over time. That is, Devices B, C and D and their applications and GNSS-operative peripherals therein, can remain in a powered down state until an appropriate location and time for content capture. Then, when the second Devices 104, 504 and 505 are each proximate in location and time for the content capture event, the second devices 104, 504 and 505 can detect crossing a geographic boundary 405 such as the boundary 142 associated with the designated capture location 140 (see FIG. 1). For clarity of illustration, only a single communication 507 from Device B 104 is shown. However, each of Device C 504 and Device D 505 also transmit to the first device (Device A) 102 at least a simple message indicating availability.

In the embodiments where a first-to-fulfill opportunity exists, a reply communication or post capture communication 408 is made by Device A 102 to the server 160 and ultimately via a separate message 409 to the Device B 104 and to the other Device C 504 and Device D 505 in the swarm 511; as shown, this post-capture communication 408, 409 is to Device B 104 only. In certain embodiments, such post capture communication 408, 409 occurs after each successfully received content at the first Device A 102 from one or more of the second devices 104, 504, 505. This post-capture communication 408, 409 can occur as soon as the Device A 102 receives the first network packet from one of the second devices B, C and D 104, 504, 505 (the first-to-fulfill second device B), and then, optionally, when receiving content from the other devices as the capture events occur.

In some embodiments, where the system 500 is configured to do so, the post-capture communication reduces the overall network communications by communicating to any not-yet-capturing devices in the swarm 511 that a first capturing device (e.g., Device B 104) is already beginning capture or has accepted the request to capture content. In such embodiments, for a first-to-fulfill request, the system 500, while not illustrated, includes sending the non-first-to-fulfill Device C 504 and Device D 505 a message which includes information withdrawing the opportunity for fulfillment so that the users (operators) of Device C 404 and Device D 405 do not continue to take actions to fulfill an opportunity that is no longer active. In certain embodiments, the system 500 is capable of originating this cancellation message from either the server 160 to the Devices C 504 and D 505 or to these same devices 504, 505 directly from Device B 104 based on a status update message being received by the Server 160 and originating from the first Device A 102 to the server 160 or the swarm 511 that a first-to-capture opportunity has been taken or is currently and actively being fulfilled.

With respect to FIG. 5, and similar to the mechanism shown in FIG. 4, the secure communication 507 from Device B 104 to Device A 102 is synchronous in certain embodiments. For multi-fulfillment embodiments of the system 500, each of the communications 507 from the respective Device B 104, Device C 504 and Device D 505 is synchronous and secure (e.g., by way of respective virtual private network (VPN) tunnels between Device A 102 and the Device B 104, the Device C 504 and the Device D 505). The one or more transmissions 175 occur until the secured captured content 122 is completely transferred to Device A 102.

Upon completion of each transmission 175, certain post-capture communications 408, 409 occur from the first Device 102 and each fulfilling Device B 104, Device C 504 and Device D 505. The communication messages 508, 509 are sent either from the first device 102 to the server 160 (or directly to the second devices 104, 504 and 505) whereby the first device 102 confirms successful and complete delivery of secured content to the first device 102. In certain embodiments, these communications 408, 409 trigger the release of a payment or other type of activity (subsequent in time to the delivery of the secured content) for the benefit of persons or users associated with respective fulfilling devices 104, 504 and 505.

Figure 6:
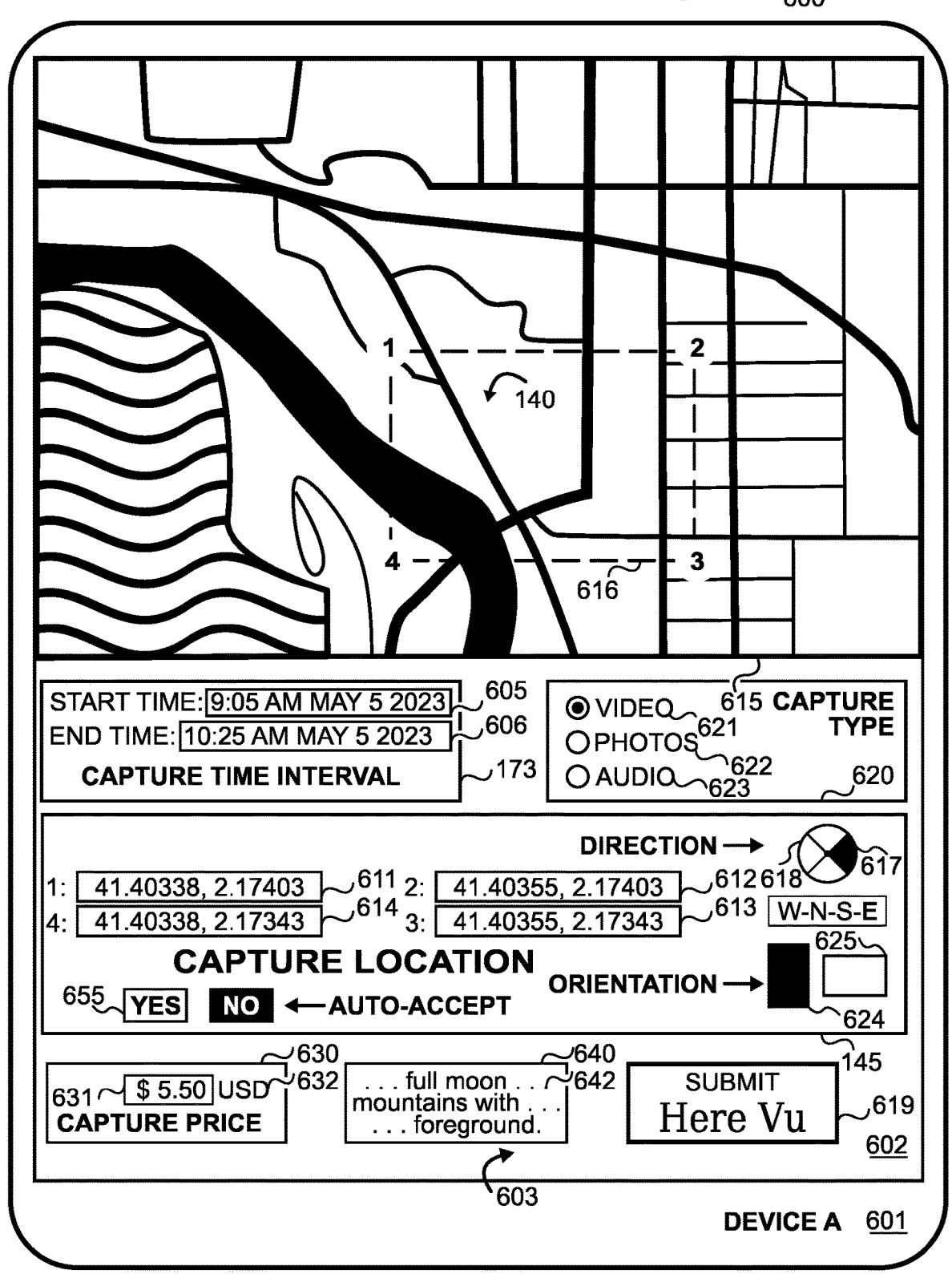
FIG. 6 is a line drawing of an embodiment of a system including a first device and user interface for location identification and scheduling of remote device content capture according to some embodiments.

FIG. 6 is a line drawing of an embodiment of a system 600 including a first device 601, its physical display 602 and its user interface 603 (e.g., software operative on the device 601 in a user space) for location identification, scheduling and secure capture of content. Through this user interface 603, the first user 101 generates certain aspects of a remote content request according to some embodiments. The remote content request includes a capture time interval 173 which includes a start time 605 and an end time 606. The request also includes a capture type including one of (for example): a video 621, a drone video (not illustrated), one or more photos 622 and audio 623. In this embodiment, a capture location includes a geographic region 616 indicated on a (zoomable) interactive map 615. The interactive map 615 is an electronic-based map or set of map information in electronic, data-storage format that, when used, by a user, is rendered in a graphical way on the display 602.

The geographic region 616 is a geographic boundary for determining an allowed remote content capture location. Most users would likely find it easier to select a first point (e.g., top-left corner "1") and drag a touch on the display 602 to a second point (e.g., bottom-right corner "3") onto the display 602 thereby identifying a rectangle (geographic region 616) corresponding to the designated capture location 145.

The capture location 145 shows a decimal-based geographic set of coordinates 611, 612, 613 and 614 corresponding to corners of the rectangular geographic region 616—respectively, the corners 1, 2, 3 and 4. As illustrated in FIG. 6, a designed capture location generally requires at least three "capture vertices" to define a two dimensional location from which a remote content capture is desired, at least where where linear boundaries are used.

In other embodiments, a circular boundary (not shown) may be used to define the designated capture location 140. In such alternative embodiments, a user (not illustrated) is able to select a central location and drags a touch to a final radius of a circle that defines a single boundary for a region for the request for content capture. That is, in such other embodiments, a point is selectable on the interactive map 615 and a single radius-based distance from the point is selectable a distance away from the single point on the interactive map 615 (selected by, for example, lifting a touch away from the physical display 602). In either type of embodiment, a region is created by defining at least two parameters that define a geographic region for a designated capture location 140: (1) a location, and (2) a boundary which is used to determine when content capture is appropriate for a particular capture request.

In certain embodiments, as shown in FIG. 6 each of the coordinates 1, 2, 3, 4 may be adjusted manually by entering improved or more precise numbers in the user interface elements 611-614 for the same. In some embodiments, such more precise numbers may be entered by zooming and dragging one of the corners 1-4 to a more preferred location on the map 615. When interactively altered, the map 615 adds or subtracts landmarks, roads and other features and geographical markers to aid the user 101 in identifying the designated capture location 140 and the underlying data for the same. The designated capture location 140, geographic region 616 and its boundary or boundaries also include one or more selected directions 617 out of possible directions 618 for specifying a general direction in which to point the second device 104 when fulfilling a captured content request. The directions 618 are also provided in an abbreviated format of West-North-South-East ("W-N-S-E") with East or "E" shown in bold corresponding to the selected direction 617.

The designated capture location 140 also includes one of two orientations for the capture device 104 (aka second device). That is, a portrait orientation 524 and landscape orientation 525 are available and one or both of these orientations may be allowed when creating a content capture opportunity. In FIG. 6, the portrait orientation 624 is shown selected as a filled rectangle and the landscape orientation 625 is shown as outline only indicating a non-selected state for such second orientation for the taking device 104. Each of these orientations 624, 625 may be selected independently of one another. When both orientations 524, 525 are selected (or none of the orientations), the remote content capture can be performed by the taker 103 with the Device B 104 in either orientation and that the requestor 101 has no preference or requirement for the orientation of the capture.

In some embodiments, each capture request includes an option for automatic acceptance of remotely captured content. That is, when the taker 103 and the Device B 104 fulfill the request, the requestor and the UI for making a request has the option of "YES" or "NO" as shown with auto-accept UI elements 655 in FIG. 6. In the illustrated UI, the "NO" option is activated meaning that the remote capture content will be evaluated by the requestor 101. That is, a thumbnail or quality or accuracy check is made by the system or by the requestor 101 on the first Device 102. A thumbnail, short video clip representative of the captured content, or a trial-content is provided to the first device 102 from the designated location by the taker 103 and provided by the second (taking) device 104. Subsequently, the actual, full content is captured, or captured and delivered, or subsequently delivered in full, from the designated location after the requestor 101 indicates success and thereby a message delivered to the taking Device B 104 to proceed.

If the content is accepted (with respect to auto-accept 655), a capture price 630 is paid upon successful capture of the content and successful delivery of the same. If the content is not accepted, at least a minimum fee (such as set by the system) is paid to the taker 103. In other embodiments, a minimum fee alternatively may be set or waived by the requesting user 101. If the taker 103 fails to take the requested capture within the specified capture time interval 173, no fee of any kind is paid by the taker 103. In some embodiments, the taker 103 is charged a fee for failing to complete a reserved ("taken") request. If the content request is set to "YES" with the appropriate auto-accept UI element 655, the remotely captured content is delivered without any intermediate steps or preview-type of "acceptance" performed at the first requesting Device A 102.

In certain embodiments, a request and transaction between Person A 101 and Person B 103 will include a quid pro quo-a recompense for fulfilling the remote capture. In other embodiments, no compensation or other further component of a remote content capture request is available or part of a remote capture or remote capture request. That is, the capture price 630 is optional. As shown in FIG. 6, a request also includes a capture price 630 that the first user 101 is willing to pay and will pay in exchange for a successful remote capture from the capture location 145 if taken: (1) within the designated capture time interval 173, (2) of the proper capture type 620 as indicated by a radio button UI element in the selected configuration for video 621, and (3) generally taken at the indicated location and (4) in a requested orientation 624, 625. The capture price includes a value 631 and a currency type 632. The payment, according to some embodiments, occurs by one or more post-capture communications 408, 409. If the opportunity capture time interval passes without the taker completing the request, the taker who has accepted the request, the request will have fallen into the "accepted" and "unfulfilled" state(s). The taker 103, for whatever reason, was unable to take a video capture or chose not to take the same. In such situation, the requestor 101 will not pay any fee or price. In other embodiments and situations, if a request is fulfilled, and the content is not accepted either by the system or by the requestor 101, the system provides a minimum fee to the taker 103.

In FIG. 6, optionally, the UI 603 provides a mechanism for the first user 101 to enter text-based or other type of special instructions 642 or context via a context UI element 640. In certain embodiments, the special instructions associated with the capture request may be used to check the subject matter of the captured content against key words of the special instructions 642 by way of application of image recognition algorithms. That is, the second (capture) device 104 is configured with instructions to perform object recognition within the captured content and provide a quality rating as measured against one or more of criteria in the special instructions. In other embodiments, the special instructions may include a minimum video image size or capture resolution for the request. If a 4K video is desired or required in the capture request, a further UI element is presented in the user interface 603 for the same. When sufficient or the minimum required details are selected or entered in the user interface 603, the first user 101 selects a "submit" UI element 619. In certain embodiments, the submit UI element 619 appears or becomes selectable by the first user 101 (not shown in FIG. 6) when the required details or minimum number of details are entered into the UI 603 or when all allowable conditions and states of the elements are satisfied. For example, if the first user (not shown) selects a region 616 on the interactive map element 615 that corresponds to an airport from which drone footage is desired, a government permission or regulation may be implicated and the device 601 or the server 160 may programmatically not allow for submission of a capture request through the submit UI element 619 for such situations and geographic conditions.

In some embodiments, the details of the remote content capture request are sent to the server 160 and processed only after selection of the "submit" UI element 619. In other embodiments, each entry of details of the capture request are sent in near real time to the server 160, one at a time, prior in time to selecting the submit UI element 619 and the server 160 records, processes and replies to the first device 101 and the UI 603 to enable correct interactivity for creation of the remote capture request. For example, for a new region on the map element 615, the server 160 provides updated map features and map content or prohibits certain selections based on a prohibited geographic location that may be off limits (e.g., military installation, airport, dangerous location, non-networked location per a cellular coverage map). In certain embodiments, the server 160 provides suggestions for regions 616 for any given map segment 615 shown to the first user 101 in the UI 603. These suggestions may be based on a historical record of past remote captures or based on popular destinations or geographical or destination features within the current interactive map segment 615.

While not illustrated in FIG. 6, some embodiments of the UI 603 include the elements of existing remote content capture opportunities, either not-yet-fulfilled opportunities or already fulfilled opportunities, that can be cloned or "repeated" for the first (requesting) user 101. In this way, a reduced number of steps for first users 101 via the UI 603 can be reduced. That is, a requesting user 101 can effectively request a "same" previously fulfilled opportunity (e.g., picture of the Statue of Liberty from a particular geographic point) within the particular map element 615 on the display 602. The first user 101 simply selects a "capture" icon on the map element 615 and hits "submit Here Vu" via the submit UI element 619. The corresponding details for a new opportunity are submitted into the system 100, 600 for takers 104 to then fulfilled the cloned opportunity and get compensated for the same.

Figure 7:
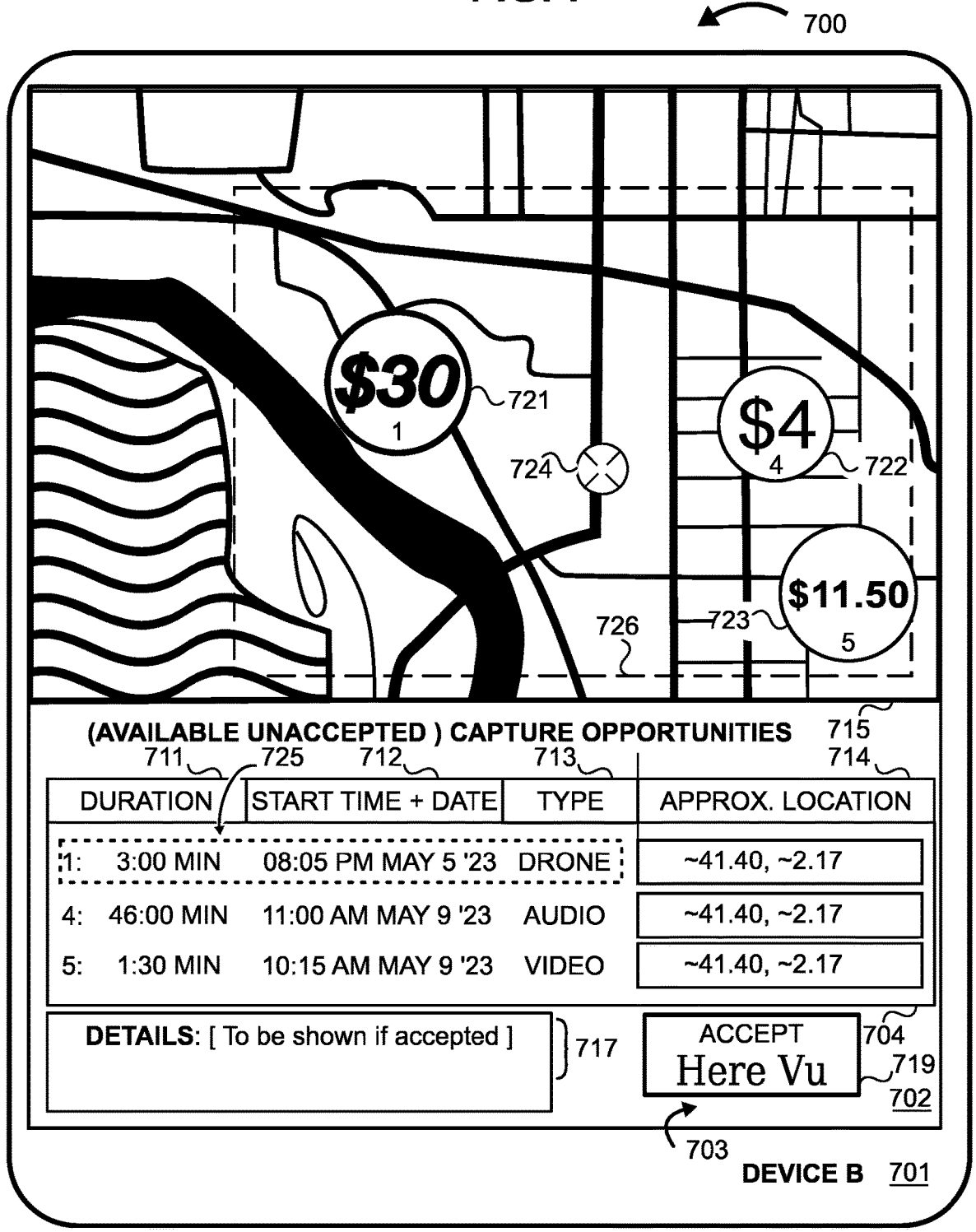
FIG. 7 is a line drawing of an embodiment of a system including a second device and user interface for accepting to fulfill one or more existing, available and unaccepted content capture opportunities according to some embodiments.

FIG. 7 is a line drawing of an embodiment of a system 700 including a second device 701, its physical display 702 and user interface 703 for browsing and accepting (contracting) to fulfill one or more existing, available unaccepted content capture opportunities. The system 700 is just one of many possible embodiments of the system 700 and its UI 703.

According to some embodiments, opportunities are displayed only as graphical symbols (e.g., numbered circles 721, 722 associated with a particular broad geographical area). In other embodiments, each opportunity is presented as a text-based entry in a list of opportunities with little or no map-based element displayed. In such list of opportunities, each opportunity includes, for example, a distance from a current position of the device 701, a capture time for content capture, a "plus-or-minus" window relative to the capture time, and a total amount of content requested for the particular opportunity.

With reference to FIG. 7, the user interface 703, according to some embodiments, is a software or software-based application operative on the second device 701. In the system 700, and by way of example, three opportunities are available to the device 701 based on a current geographic location of the device 701 and these three opportunities are displayed as, and numbered for sake of simplicity, "1", "4" and "5", respectively. Each of these opportunities are employment opportunities that respectively pay $30.00 USD, $4.00 USD and $11.50 USD. The device 701 is an example of the second device 104 at a particular point in time where the opportunities 1, 4 and 5 are time-specific.

In the system 700, and by way of example only for the particular UI 703, the available content capture opportunities "1", "4" and "5" are displayed with two different mechanisms. According to a first mechanism, in an upper portion of the UI 703, the content capture opportunities are represented as numbered circles 721, 722 and 723. According to a second mechanism, the same opportunities are presented in the form of a list 725 with further details about each opportunity.

With respect to the graphical display, in the upper portion of the UI 703, while the numbered circles are shown in different portions or locations within a demarcation 726 on a map element 715, each of the opportunities "1", "4" and "5" pertain to and actually have a yet-unknown (to the taker 103) boundary associated with the actual geographic location for the opportunity somewhere within the demarcation 726 area. The circles 721-723 are only shown separated from each other within the demarcation 726 so that a taker 103 can activate, highlight, select or identify for the system 700 one of the opportunities for acceptance in the UI 703, to thereby reserve the opportunity to the taker 103 and to commit to fulfill the particular opportunity. The circles 721-723 may be shown in the UI 703 as floating circles that can be moved by a touch activation and dragging on the touch-sensitive physical display 702 when too many opportunities are available and overlap each other at a current location and map resolution. Referring again to the UI 703 and map element 715, that is, just because the numbers "1", "4" and "5" are in a particular location within the demarcation 726, the locations in the UI 703 and demarcation 726 are for convenience only.

With reference again to FIG. 7, in the map element 715, a current location of the device 701 is shown with a location marker 724. In certain embodiments, a new set of available capture opportunities is only shown on the UI 703 at a second time when the device 701 changes location such as by crossing one of the boundaries of the demarcation 726 with use of information provide by the GNSS receiver of the device 701. In other embodiments, another set of capture opportunities is shown on the UI 603 when the taker 103 selects or otherwise browses to another substantively large region such as region contiguous to the region of the demarcation 726.

Figure 8:
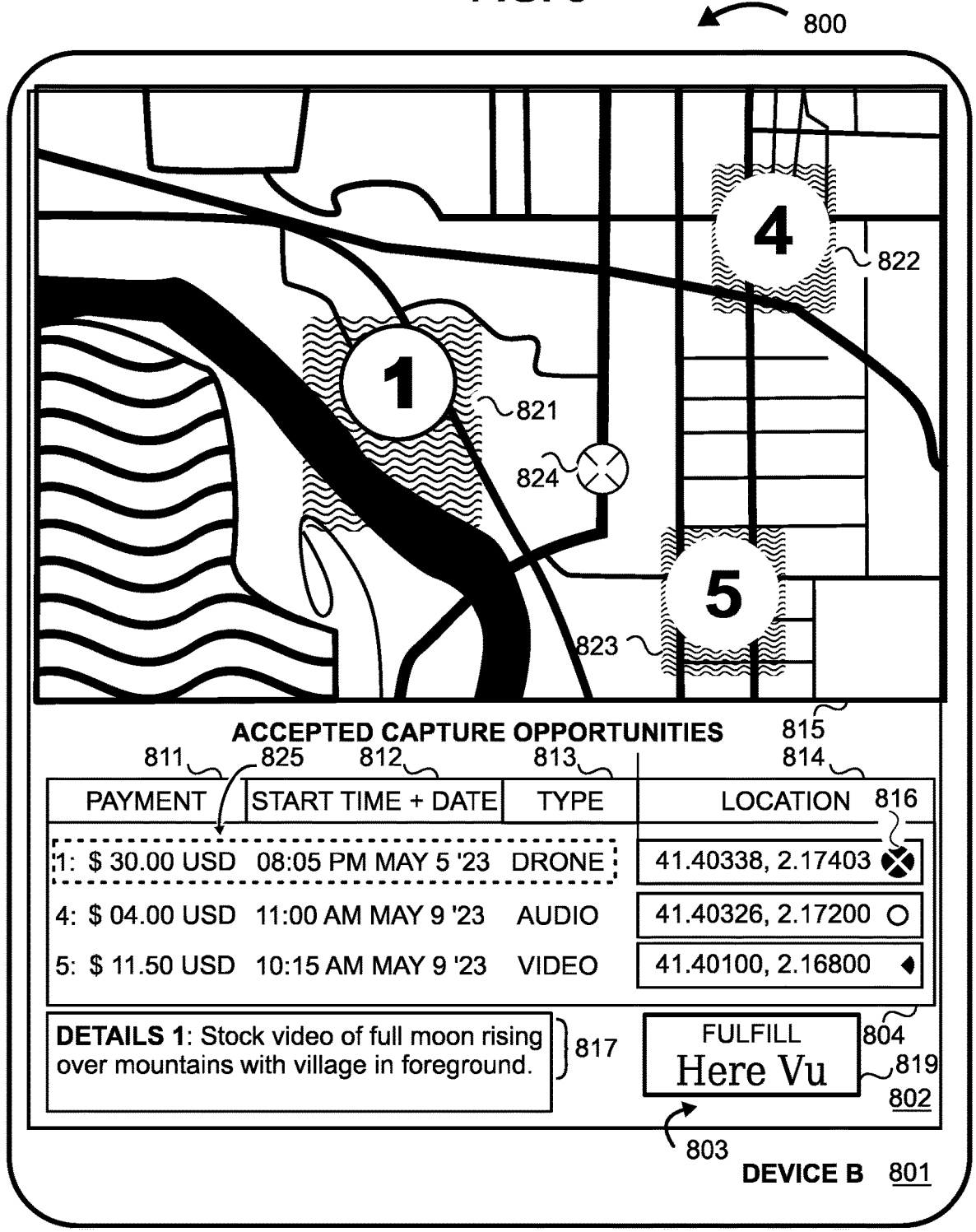
FIG. 8 is a line drawing of an embodiment of a system including a second device and user interface showing accepted fulfillment opportunities for content capture according to some embodiments.

Only after the taker 103 accepts the opportunity does a more accurate and particular location and its boundary or boundaries of the accepted opportunity became knowable, and are displayed to, the taker 103 (not shown in specific geographic detail in FIG. 7). When accepted, an accepted opportunity may be changed in the UI 703 and map element 715 to show an actual region or sub-region within the demarcation 726 to help communicate to the taker 103 where the opportunity exists. Refer to FIG. 8 for further details as an example in this regard.

With respect to the list view in the lower portion of the UI 703, when a content taker 103 wishes to browse and accept new and unaccepted capture opportunities, only the start time and date 712 and type of opportunity 713 are presented on the pre-acceptance UI 703. Prior to being accepted, only the general geographic location 714 for each available and unaccepted opportunity is shown on the map element 715—a map element similar to the map element 815.

In the lower portion of the UI 703, information about the same three opportunities is presented in list form. The three opportunities in the list 725 are similarly numbered "1", "4" and "5". The numbers in the lower portion of the UI 703 correspond to the numbered regions (locations) in the interactive map element 715 in the upper portion of the UI 703. Only a basic set of information 711-714 is available when a taker 103 browses for consideration of accepting one or more available remote capture opportunities. In the illustrated example, a first opportunity numbered "1" is for a drone video capture of at least 3:00 minutes duration 711 with a start time on May 5, 2023. A second opportunity numbered "4" is for a 46:00 minute audio recording to start at 11:00 AM on May 9, 2023. A third opportunity available to the taker 103 is numbered "5" and is for a minimum of 1:30 minutes of a video recording starting at 10:15 AM on May 9, 0223. Each of the three opportunities "1", "4" and "5" are available until at least one user (e.g., taker 103) accepts them such as through an "accept" UI element 719 or until the time for capture expires or passes.

According to some embodiments, activating the "accept" UI element 719 is just a first step to accept the opportunity by the taker and subsequent acknowledgment steps may be required. For example, an opportunity such as the opportunity numbered "5" may be for video capture near a busy freeway and certain "details" would only be visible to the taker 103 via a text-based details UI element 717 after the taker 103 activates the "accept" UI element 719. In subsequent steps, the user (not shown) may be required to accept certain additional requirements (e.g., waiver accepting personal liability for following local traffic and other regulations) when accepting a particular capture opportunity. As shown in FIG. 7, for the first opportunity "1", the "details" and any further limitations or requirements is represented by the text "To be shown if accepted." Thus, for the first opportunity "1", at this point in time, the taker does not know more about the first opportunity than what is shown in the upper and lower regions of the UI 703.

For the system 700 of FIG. 7, one advantage of presenting such a limited amount of information for each opportunity is to protect an identity of a requestor associated with each of the respective capture opportunities "1", "4" and "5". Another advantage of showing limited information is to not overwhelm takers with too many choices and information that is not likely to persuade or dissuade a taker from accepting to fulfill an opportunity. In this embodiment of UI 703, the taker and potential acceptor only has access to, at most: a duration 711 of the opportunity, a start time and date 712 of the opportunity, a type 713 of the opportunity, and an approximate location 714 of the opportunity. As shown in FIG. 7, all three opportunities "1", "4" and "5" are associated with a single and approximate latitude and longitude location −41.40 and −2.17 (by way of a specific example).

As yet another benefit of displaying a minimal amount of information for each opportunity is to reduce an amount of information that may be scraped by outside actors from the system 100, 700 about the available opportunities and thereby reduces an amount of information that may be correlated with non-illustrated or non-described information about the opportunities, the requestors, the takers and so forth. While difficult to illustrate in FIG. 7, the taker 103 may sort available opportunities in the list 725 by any one of: the duration 711, the start time and date 712, and the type 713. The opportunities "1", "4" and "5" all belong to the approximate location 714 and are thus already sorted or selected for the taker 103 for this location. Other UI mechanisms may be implemented or combined with the UI 703 to reduce or filter out certain opportunities. For example, a user may want and actually can exclude drone opportunities. In the system 100, 700, in certain embodiments, each of the opportunities "1", "4" and "5" is provided with a globally unique or semi-unique number for opportunity tracking purposes to match up a rating from one or both users 101, 103 to the particular opportunity.

Once an opportunity has been accepted and completed (fulfilled successfully), the device 701 and system 700 provides another UI and lists the opportunities that the user 103 has already completed. While not illustrated, such UI is similar to the UI 703 and, in some embodiments is presented as a list of opportunities such as those shown in the bottom half of the UI 703. The approximate location and general information about each completed opportunity is then available to the taker 103 as a reminder of what opportunities were previously fulfilled. Various requestor details remain unknown and unknowable to the taker 103. The captured content never is accessible to the taker 103. A similar list-based UI is provided on the first device 102 for the first user 101 to show previously requested remote content capture opportunities.

FIG. 8 is a line drawing of an embodiment of a system 800 including a second device 801, its physical display 802 and its user interface 803 (e.g., software operative in user space on the second device 801) listing requests that the taker 104 has already opted to fulfill and has not yet fulfilled-opportunities available to the second Device B 104: accepted content capture opportunities 825 that still need fulfilling. Generally, these opportunities 825 are within minutes or hours of a current (local) time for the (taking) second device 801. Through the user interface 803, the second user 103 has already (previously) accepted three opportunities 825 numbered "1", "4" and "5". The numbers in the lower portion of the UI 803 correspond to the respective numbered regions (locations) 821, 822, 823 in an interactive map element 815 in the upper portion of the UI 803.

Each remote content opportunity 825 in the embodiment shown includes a payment 811 (in exchange for fulfillment of the respective opportunity 825. Each accepted opportunity 825 has: a financial value (e.g., $30.00; $4.00; $11.50) and unit of currency (USD), a start time and date 812, a type of content capture 813, and a location 814 of the respective accepted opportunity. The location 814 is a much more geographically precise location compared to the approximate location 714 in FIG. 7.

In FIG. 8, the start time and date 812 is a visual indication of and corresponds to an available time interval in which to capture the content 120 for the respective opportunity 825. In some embodiments, each start time is a designated time and the UI 803 includes a "plus-or-minus" window in which to fulfill the content capture opportunity. Various UI elements and mechanisms may be used to express a time and a time window in which to fulfill each accepted opportunity 825. None of the accepted opportunities 825 are for an immediate capture where the available time interval has already started. Each accepted opportunity 825 on the UI 803 also includes a device orientation indicator 816 giving a general direction for the taking device 104 in which to capture the content. What is not shown, but is present for each opportunity, is an acceptable orientation (e.g., portrait orientation 624, landscape orientation 725) but can be shown as one or more other UI embodiments in the UI 803. An acceptable device orientation indicator is shown in other figures. Likewise, for FIG. 8, each accepted opportunity 825 has an auto-accept characteristic but which is not currently illustrated in FIG. 8 to avoid obscuring the other elements in the UI 803. Accepted opportunities 825 shown on the UI 803 may be filtered and sorted in a respective order. As an example, the opportunities 825 may be sorted and presented in a first-to-start, time-based order. Such sorting is accomplished by interaction with the UI 803 (e.g., by a single click or single touch to the column header "START TIME+ DATE"), and, in response to the interaction, then the device 801 reorders the accepted opportunities 825 via the UI 803 in the list view of the accepted capture opportunities. In an alternative embodiment, whether accepted or not, opportunities displayed via the UI 703, UI 803 may be sorted or filtered by the server 160 and then presented on the UI 703, UI 803 based on a fresh set of data delivered from the server 160 to the device 701, 703.

As shown in FIG. 8, the accepted opportunities 825 are shown in sequence by type of opportunity and are numbered in the lower region of the UI 803. Each accepted opportunity is also represented by its corresponding geographical region relative to the interactive map 815 shown on the UI 803. The first opportunity 825 is numbered "1" and is selected as is evidenced in the UI 803 in two ways. First, its region 821 in the interactive map element 815 is altered to reflect the selection such that the opportunity number "1" is bolded (enlarged) and the corresponding circle is emphasized by displaying a thicker line at the outer boundary of the circle. Second, the first row of the list of accepted opportunities 825 is highlighted in the lower portion of the UI 803. The highlighting is represented by the dotted line around the numerical indicator "1" and corresponding payment 811 of $30.00 USD, start time and date 812 and type 813. Also, when selected, further details for the respective accepted opportunity 825 are provided onto the UI 803 dynamically. As a first example, in the example shown in FIG. 8, text-based details 817 are displayed for the first opportunity "1" in a UI element.

As shown, an approximate geographic center 814 (a "location") of each respective opportunity is shown in raw decimal-based latitude and longitudinal coordinates in the lower portion of the UI 803 for each accepted opportunity 825. However, in other embodiments, the locations are (can be) shown in number of minutes of travel from a current location 824 of the second device 801 or in number of meters, kilometers or miles from the current location 824 of the second device 801 away from either a boundary of each respective opportunity 825 or from the geographic center 814 of each respective opportunity 825. The opportunities 825 have each previously been selected and accepted by the taker 103 and the accepted opportunities "1", "4" and "5" are reserved for the taker 103 (not shown in FIG. 8). When the taker 103 is in a correct geographic location and when other conditions are met, the taker is able complete the remote capture through a subsequent UI by selecting, for example, a fulfill UI element 819 (explained in more detail in relation to other figures including FIG. 11). The second user (taker) 103 is obligated to complete the transactions by capturing content corresponding to the details of the respective accepted opportunities 825. If the particular second device 801 or particular taker 103 is not registered for, qualified for, or not capable of fulfilling any given opportunity, the opportunity would not have been reservable through any UI, would not have been reserved and would not be capable of appearing in this UI 803.

In terms of not capable of fulfillment for any particular taker and taking device 104 participating in the system 100, the respective opportunity may be foreclosed for one or more various physical conditions or non-tangible reasons. For example, the second user 103 is not qualified for the particular opportunities. The device 104, 801 may not be physically close enough to reach the opportunities such as the accepted opportunities shown as "1", "4" and "5" in FIG. 7 and FIG. 8. As another example of being foreclosed from accepting an opportunity, if a particular user does not have enough time to complete the capture within the time interval associated with the respective opportunity or to actually start capture within the opportunity's time interval, the particular taker would not be able to accept such opportunity. As another example, if the device 104, 701, 801 and its peripherals are not equipped or capable to capture 4K video, then 4K opportunities would be foreclosed to the taker 103 and the device 701 would not show such opportunities 725 as available to be accepted. Such foreclosure status would change for the taker 103 if the taker 103 registers and actually operates a different device with the system 100, 300, 400 a device that is capable of generating 4K video.

As another example, if the taker 103 has only previously captured and fulfilled two prior "herevu" remote content capture opportunities, and the particular capture opportunities each require fulfillment by system users with ten (10) or more successful, previous opportunities, then the particular taker 103 (and corresponding account) are foreclosed from seeing, selecting and accepting UI elements those capture opportunities 725, 825. Thus, not all available opportunities-even those within a same geographic region as the taker 103, are shown to or acceptable by, the taker 103 through the taking (second) Device B 104.

As another example of not being able to see or accept a particular opportunity, for drone footage, if the taker 103 has not registered a drone device with the server 160, a capture opportunity, like the first accepted opportunity "1" 725 in FIG. 7, may be foreclosed to the device 701. As a last example, if the taker is physically two hours away by car from the available and unaccepted opportunities (e.g., due to large distances or current traffic conditions) and the opportunities start within one hour, the taker 103 and the device 701 may be foreclosed from reserving any of such opportunities. The accepted opportunities 725, by their nature are forward in time from the current time of the device 701.

Figure 9:
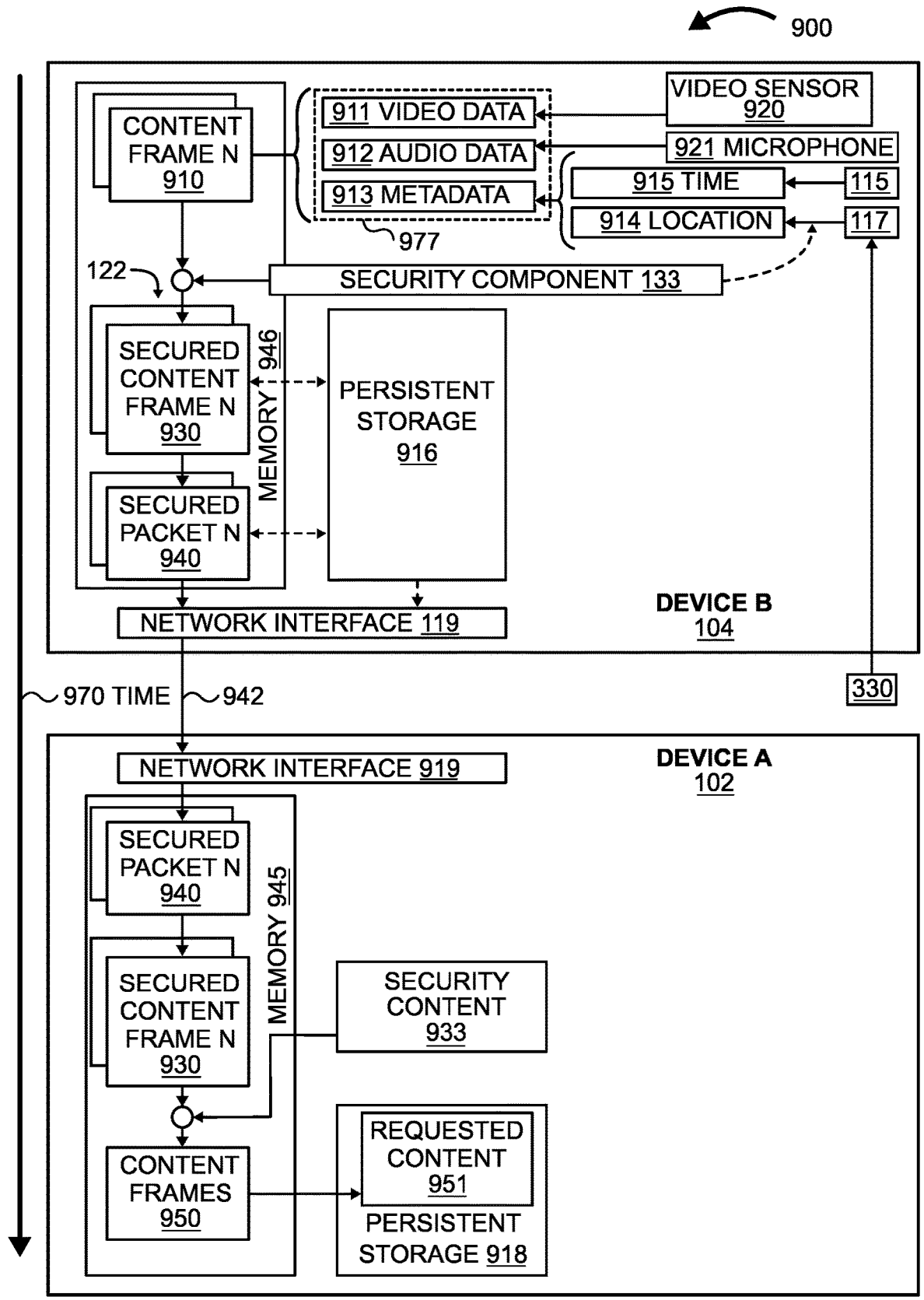
FIG. 9 is a line drawing of a system and components of a pair of devices configured for securely routing secured remotely captured content from a second device to a first device according to some embodiments.

FIG. 9 is a line drawing of a system 900 and components of a pair of devices 102, 104 configured for securely routing secured and remotely captured content 122 from the second device 104 to the first device 102 according to some embodiments. As described herein, and for sake of explanation, the requested content 951 (captured content 120 of FIG. 1) is a series of still images commonly referred to as a motion picture or video delivered to the first device 102 but can be any other type of data. The second device 104 (Device B) includes various components or peripherals including: a video sensor 920, a microphone 921, a device hardware clock 115, a GNSS receiver 117, a persistent storage unit 916, a volatile memory 946 and a hardware network interface 119. The various components 115, 117, 920, 921, 916, 946 and 119 are in electronic communication with each other at least as shown. One example of the communication is via a packet-based network between the devices 104, 102.

During a remote content capture session (while fulfilling a remote capture opportunity), the video sensor 920 generates video data 911 and the microphone 921 generates audio data. Metadata 913 are generated based on, for example, a time 915 based on the clock 115 and a current location 914 of the Device B 104. Together, the data 911, 912 and 913 are the captured content 977. The current location 914 may be, in at least some embodiments, a last known or last calculated location and may be a few seconds or a few minutes old.

In some embodiments, the location 914 is secured by encryption using the information in the security component 133 (e.g., symmetric encryption key of the first user 101 (not shown in FIG. 9)) prior to saving the location into the metadata 913. In certain embodiments, some of the video data 911, audio data 912 and metadata 913 is cryptographically signed by a signature that is derived by a component of Device B (e.g., the IMEI (international mobile equipment identity number) of Device B, the ICCID (integrated circuit card identification) number of Device B) or the second user 103 or user account information (e.g., unique or semi-unique user account number, geographic location of device combined with user account number) operative or available (e.g., stored, or available in the server 160) on Device B and such signature is included in the metadata 913 itself.

Together, the captured content 977 (one or more of the video data 911, the audio data 912 and the metadata 913) make up one or more content frames 910 numbered 1 to N to show a plurality of frames 910 generated by the second device 104. In some embodiments, the content frames 910 are the captured content 120 discussed in relation to other figures. The data 911, 912, 913 are processed and combined in the memory 946. The content frames 910 (captured content 120) is then converted to the secured content 122.

The secured content 122 is generated by combining the content frames 910 with the security component 133 or part thereof. For example, the content frames 910 are encrypted with a symmetric key. As needed, and as content is captured over time at the captured location, and depending on the available size of the memory 946 and amount of captured data 911, 912, 913, and prior to routing the same to the first device 102, one or more of the secured content frames 930 and the secured packets 940 are temporarily stored into the persistent storage 916 or into one or more semi-persisted storage registers of a CPU or GPU (not illustrated in the devices 102, 104). Examples of the persistent storage 916 include a semiconductor storage device, a solid-state device, a solid-state disk (SSD) and a NAND flash-based memory device. In embodiments, the generation of data 911, 912 913, creation of the frames 910 and creation of the secured content frames 930 are part of a single atomic, non-interruptible and non-corruptible, secure process. In other embodiments, the atomic transaction includes these steps plus transmission from the first network interface 119 to the second network interface 919.

During processing by the second device 104, the secured content frames 930 are packaged into secured packets 940 and are shown as numbered 1 to N thereby showing a series of secured packets 940. These secured packets are released or routed to the network interface 119 such as into a circular buffer of the network interface 119 or having the network interface 119 controllable to pull or receive a push from the memory 946. In some embodiments, a connection is already established (prior to content capture). In other embodiments, a connection is established between the first device 102 and the second device 104 at the same or near-same time as the start of content capture. Either the first device 102, the second device 104 or both the first and second devices 102, 104 initiate and maintain the connection. Over time 970, the secured packets 940 are transmitted, such as over a wireless (WI-FI) network or cellular network, from the network interface 119 of the second device 104 to the network interface 919 of the first device 102. In some embodiments, the first transmission of secured packets 940 from the second device 104 is to an intermediate device such as a core router or edge router or onto a device of a cellular network.

In certain further embodiments, further processing prior to transmission between the network interfaces 119, 919 yield packets that are further secured as further secured packets 942.

In some of these embodiments, the transmission between the network interfaces 119, 919 is a secured transmission (e.g., over a VPN communication between the first device 102 and the second device 104). Next, the received secured packets in the memory 945 of the first device 945 are reassembled and the secured content frames (1-N) 930 are generated on the first device 102. A security content 933 is used to convert the secured content frames 930 into the delivered content frames 950. The content frames 950 may be stored into a persistent storage component 918 of the first device 102. The requested content 951 is the result of the successful remote capture, transmission and delivery of the remote content. The second user (taker) 103 (not shown) is not able to access the captured content 977.

It is optional that the video is displayed on the second device 104 at the time of data capture and thereby the mechanism of the system 900 avoids the possibility of an analog "hole" in capture and delivery of the content from the second device 104 to the first device 102. This mechanism thereby avoids the possibility of a duplicate copy of the captured content 977 for use or persistence by the second user 103. Optionally, and not shown in FIG. 9, the first device 102 sends a "successful delivery" message or communication after successfully rebuilding either the secured content frames 930 or the content frames 950 thereby communicating to the second device 104 that atomic delivery of the remotely captured content 977 has been delivered to the first device 102 and thereby to the first user 101. The server 160 may receive such message and thereby a remuneration or other contractual obligation for successful and secure remote delivery can be performed subsequent to the content delivery.

Figure 10:
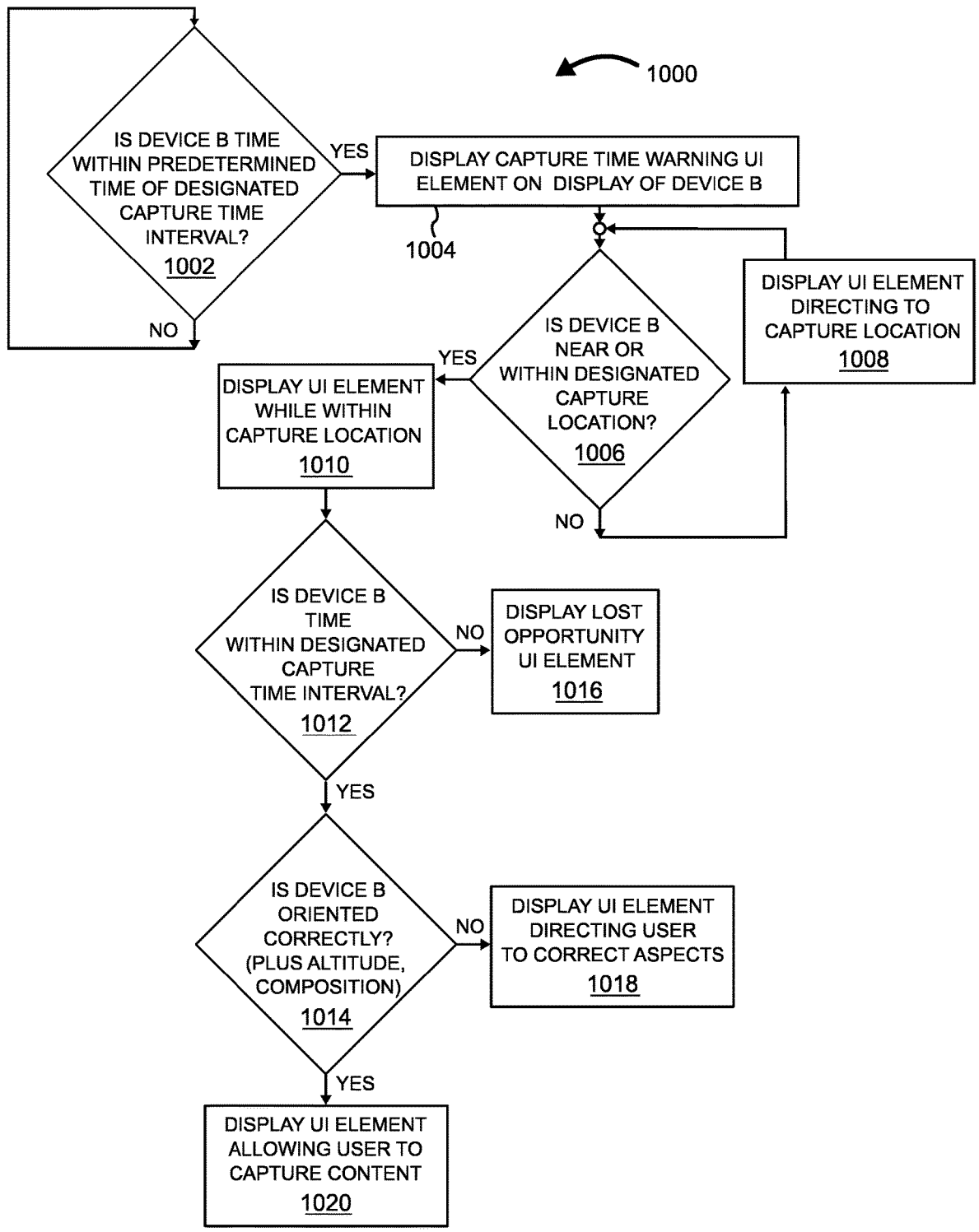
FIG. 10 is a block diagram of a method for allowing a device to capture content remotely and fulfill a remote capture request according to some embodiments.

FIG. 10 is a block diagram of a method 1000 for allowing a device (e.g., second device 104) to capture content remotely and fulfill a remote capture request according to some embodiments. While this method 1000 includes steps, decisions and queries in a particular order, the various steps, decisions and queries are done in any order where it makes sense since some or all of the steps and conditions may be independently satisfied to meet the logic, conditions and requirements for a content capture request and opportunity to capture the content.

At step 1002, the second device 104 (Device B) determines whether the Device B time is within a predetermined time of the actual designated (future) capture time interval 136. For example, is the current time as determined by Device B about five minutes before the scheduled event? If not, the Device B waits and checks again at step 1002. If the capture time is approaching, and a time threshold is crossed, at step 1004, a display capture time warning UI element is activated on Device B. For example, the Device B activates an audible chirp, audible alert or alarm or causes a visual pop-up reminder to appear. As another example, at step 1004, Device B causes a remote capture software application to enter into an active status and displays the same on the interactive touch-enabled display of Device B. At this point in time, the location components of Device B may be put into active use.

At step 1006, Device B determines whether the Device B is near or within the designated capture location 134. If not, the system through Device B directs the second user (not illustrated) to the actual designated capture location. For example, the Device B provides audible travel directions to the second user. In another example, at step 1008, Device B displays a UI element with text-based instructions or visual indicators pointing the taker 103 and Device B 104 to the designated location-nearest boundary of the designated location associated with the particular content capture request next scheduled for completion by the Device B 104.

When the Device B satisfies step 1006, Device B shows one or more appropriate display UI elements communicating to the taker that the second user is successfully within the designated area (has crossed a border associated with the designated (requested) capture geographic region). Next, at step 1012, Device B determines whether the Device B time is within the designated capture time interval. If not, and the time for remote capture has past, at step 1016, the Device B displays a message that the remote content capture opportunity was lost or that the time has past. If not, and the time for remote capture is still in the future, the Device B displays a countdown timer or provides a similar type of time-based UI element to advise about a current time relative to the start time of a capture opportunity. If the Device B has satisfied step 1012 (the appropriate capture time has arrived), the Device B determines if the capture components or peripherals are active and available and that the device is oriented correctly. Orientation is one or both of: (1) directional orientation and (2) portrait versus landscape orientation.

In some embodiments, if Device B has not satisfied the orientation statuses and other capture aspects associated with the capture opportunity at step 1014, Device B displays UI elements at step 1018 directing the user to correct the one or more aspects in relation to the capture opportunity for the Device B. For example, if the Device B needs to be pointed more toward the East, and the second user is generally pointing the Device B southward, the UI element directs the second user to turn the Device B more toward the East. As another example, based on one or more gyroscope elements of Device B, if Device B and its camera and video sensor are pointing toward the ground, the Device B activates a UI element to encourage and direct the second user to rotate the Device B into an appropriate position. Finally, when the condition at step 1014 is correct, then required conditions generally should be satisfied for a successful attempt at fulfilling a previously accepted remote content capture opportunity. At step 1020, the Device B displays a user element that can be activated to allow the taker (second user 103) to capture content as explained further herein including in relation to other figures. In operation, the method for allowing or assisting the taker 103 to fulfill the capture opportunity may be more complex or less complex than the method 1000 illustrated in FIG. 10.

Figure 11:
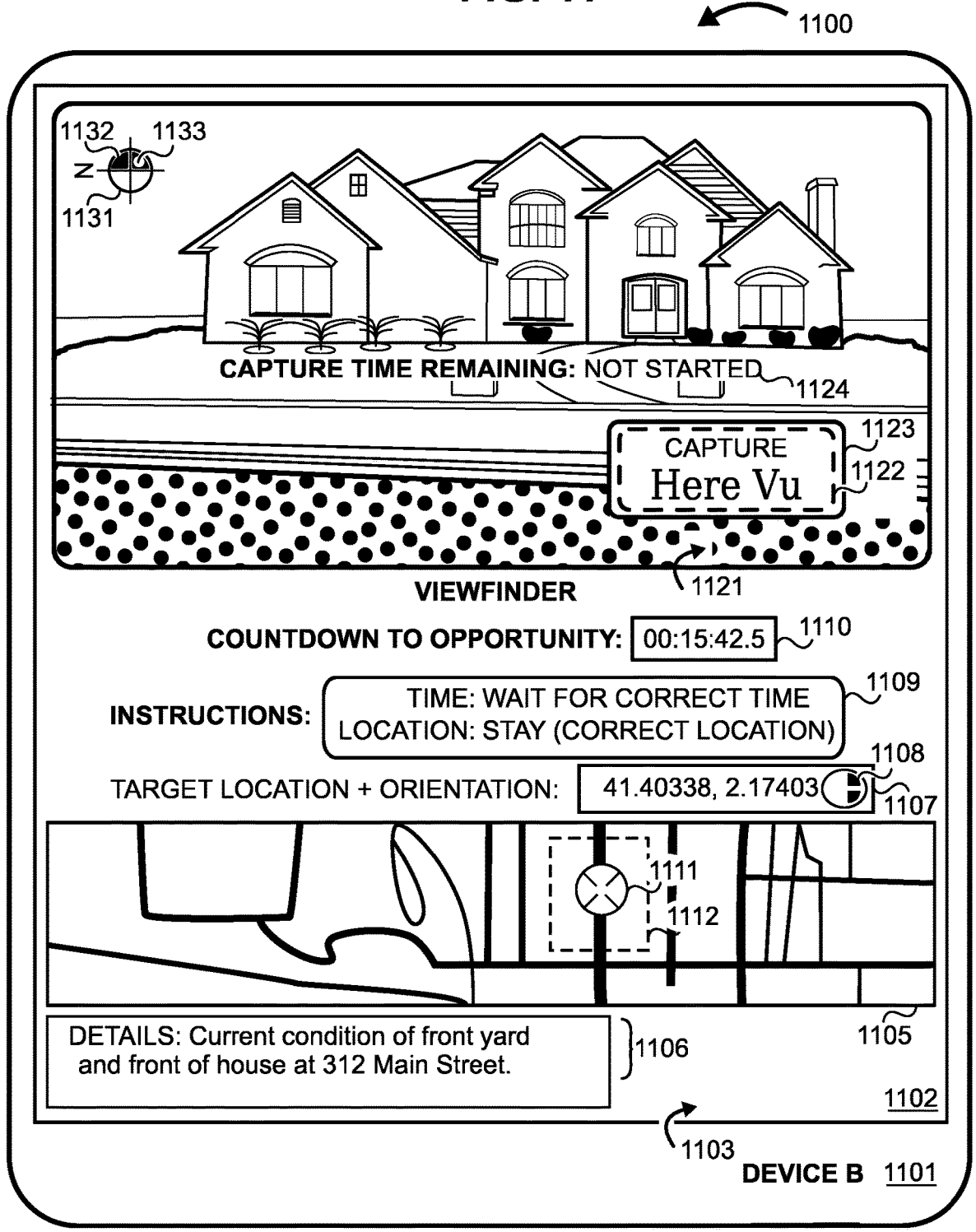
FIG. 11 is a line drawing of an embodiment of a system including a second device and user interface for capturing content when conditions of a content capture opportunity have been met according to some embodiments.

FIG. 11 is a line drawing of an embodiment of a system 1100 including a second device 1101, its physical display 1102 and its user interface 1103 (e.g., software operative on the second device 1101) for capturing content when conditions of an accepted content capture opportunity 825 have been met according to some embodiments. For example, the conditions of the steps of the method 1000 have been satisfied and the UI 1103 is operative on the second device 104 (device 1101).

In the system 1100, various UI elements of the UI 1103 are presented to a user such as the taker 103 on the second device 104. A current location 1111 of the second device 1101 is shown relative an interactive map component 1105 and a geographic based boundary 1112 of a generally rectangular area. At a current time as shown in FIG. 11, the device 1101 is located 1111 within the boundary 1112 of the particular capture opportunity that the user is preparing to fulfill. In certain embodiments, the system 1100 and the device 1101 are operative when device 1101 is within a pre-defined proximity distance (in or just outside of) the boundary 1112. In certain embodiments, a current set of text-based opportunity details 1106 is visible to the taker 113 on the UI 1103. In FIG. 11, a target location 1107 and a target directional orientation 1108 for device 1101 are presented as dynamic UI elements—where behaviors of these UI elements change over time as determined by one or more current conditions or states of peripherals of the device 1101 and a geographic location and a geospatial orientation of device 1101, respectively. In other, simpler embodiments, fewer UI elements and fewer details about the particular capture opportunity are not needed and are thereby not shown via the UI 1103.

In the system 1100, at the time shown, the remote capture opportunity is still 15:42.5 (minutes:seconds) in the future. A countdown timer UI element 1110 communicates a remaining time to wait on the UI 1103. The countdown time is a time remaining until a start time of the content capture opportunity. Consistent with the map component 1105, the location is correct and the corresponding part of the instructions 1109 indicate to "stay" since the second user has traveled and brought the device 1101 1101 into a viable geographic location that satisfies the capture opportunity. The other part of the instructions 1109 indicates to "wait for correct time" by which the second user knows to rely on the countdown timer (UI element 1110) for the opportunity to begin. In other, simpler embodiments, fewer time-based UI elements and fewer time-based prompts and details about the particular capture opportunity are not needed and are thereby not shown via the UI 1103.

In the top portion of the UI 1103, a software application is operative in the device 1101 and presenting content on the display 1102—showing a representation of observed content captured by the image sensor (not shown in FIG. 11) of the second device 1101. The representation is part of a viewfinder 1121 for the software application and UI 1103. The viewfinder 1121 is one embodiment of possible embodiments to enable capture of content by the taker 103 and illustrates certain features of how to interact with the system 1100. The viewfinder 1121 illustrates the device 1101 and its camera peripheral elements pointed at a house at 312 Main Street in the specific example illustrated in FIG. 11.

The viewfinder 1121 in this embodiment includes three operative viewfinder UI elements. For the first viewfinder UI element, in a top-left corner of the viewfinder 1121, an orientation element 1131 shows a current orientation of the device 1101 and its camera relative to geographic north ("N"). The orientation element 1131 changes as the device 1101 changes direction. As shown, device 1101 is pointing generally East with two directional opportunity indicators 1132 indicators corresponding to the static orientation indicators 1108 further below in the UI 1103 within the target location box 1107. A current orientation indicator 1133 is active (represented as a white circle) in the second of two opportunity indicators 1132 which communicates to the second user 103 that the device 1101 is currently satisfying one of the two orientation requirements (1132) of the opportunity in active fulfillment (the subject of FIG. 11).

The second viewfinder 1121 UI element is the "capture time remaining" text super-imposed over the top of the scene in the viewfinder 1121. The text "not started" communicates that the user has not yet captured any seconds or minutes of video from a current location. When the start time arrives, this text "not started" can be an active accumulation timer indicating that the second user 103 is collecting video content. The third viewfinder 1121 UI element is an actuation UI element that includes two parts: time interval available UI element 1122 and a location UI element 1123. Both time and location for the capture opportunity must be satisfied in certain embodiments. As shown, the location for the opportunity is satisfied and the UI element 1123 is shown as a solid line. The time interval has not yet arrived and thereby the time requirement is not yet satisfied; the UI element 1122 is shown as a dashed line thereby communicating to the taker 103 that the device 1101 and the system 1100 are not yet activatable to capture content. When the time does in fact arrive, the taker will be able to activate the "button" or UI 1122/1123 and can begin capture (and transmission) at an allowable time and allowable location.

The activatable capture UI elements may be of other, less complex mechanisms. That is, the UI 1103 and system 1100 are complex embodiments of possible embodiments for user interfaces for facilitating the scheduling of remote capture opportunities and actually capturing content at a remote location by a second device 104 and routing the content securely and in a secured state to a first device 102. Simpler UI embodiments than those shown in FIG. 11 are possible and are contemplated for facilitating the systems and methods described herein at the time of drafting of this document.

I claim:

1. A method for a first device to securely obtain a content from a second device remotely located from the first device and located proximate to a designated capture location, the method comprising:

the second device receiving a first message from the first device, wherein the second device is in asynchronous and at least partially wireless networked communication with the first device when receiving the first message, and wherein the first message includes a security component and a capture instruction;

capturing the content by the second device from a peripheral of the second device; and after the content is captured from the peripheral of the second device:
securing the captured content using the security component in a volatile memory of the second device to create secured captured content; and
the second device securely routing the secured captured content to the first device.

2. The method of claim 1, wherein the capture instruction from the first device comprises one of:

a capture location associated with the designated capture location for the second device to capture the content by the peripheral of the second device, a capture time interval during which the content is to be captured by the peripheral of the second device, and both the capture location associated with the designated capture location for the second device to capture the content by the peripheral of the second device and a capture time interval for the second device during which the content is to be captured by the peripheral of the second device.

3. The method of claim 2, wherein the capture location is within a pre-defined proximity distance from the designated capture location, and wherein the method further comprises the second device determining the location of the second device relative to a boundary of the designated capture location.

4. The method of claim 2, wherein the capture time interval is allowed where an internal clock of the second device is within the capture time interval as delivered in the capture instruction.

5. The method of claim 1, wherein the content from the peripheral of the second device is captured and sent to the first device without storing the captured content or the secured captured content in a persistent storage component of the second device.

6. The method of claim 1, wherein the method further comprises:

storing in a persistent storage the secured captured content in a secure condition;

waiting until a network condition is satisfied and subsequently establishing a network connection between the first device and the second device, wherein securely routing the secured captured content by the second device includes routing the secured captured content after the network connection is established between the first device and the second device; and removing the secured captured content from the persistent storage by overwriting the location in the persistent storage of the captured content in the secure condition.

7. The method of claim 1, wherein the content from the peripheral of the second device comprises one or more of:

an image captured by an image sensor as the peripheral of the second device, a video captured by the image sensor as the peripheral of the second device, an audio stream captured by a microphone as the peripheral of the second device, a geographic location of the second device at or near a time of capture of the content or within the capture time interval, a timestamp from a clock as the peripheral of the second device, and a text entered into a text entry component as the peripheral of the second device.

8. The method of claim 1, wherein the first device specifies the amount of content to be captured by the peripheral of the second device and communicates the same to the second device prior to the second device capturing the content.

9. The method of claim 1, wherein the designated capture location is identified either by the first device or the second device with the use of electronic map data.

10. The method of claim 1, wherein:
the second device includes a global navigation satellite system (GNSS)-based receiver; and
the second device uses information from the GNSS-based receiver to detect arriving at a position within a proximity distance of the designated capture location during the capture time interval or within a larger proximity time interval that at least partially overlaps the capture time interval.

11. The method of claim 1, wherein the first device is a smartphone, a tablet, a personal computer or a drone, or wherein the second device is a smartphone, a tablet, a personal computer or a drone.

12. The method of claim 1, wherein the securing of the captured content using the security component in the volatile memory of the second device includes securing the captured content in one of: a video format frame, a portion of a video format frame, a network packet and a network packet payload.

13. The method of claim 1, wherein securing the captured content comprises the second device asymmetrically encrypting the captured content prior to the second device routing the encrypted captured content to the first device.

14. The method of claim 1, wherein securing the captured content comprises the second device asymmetrically encrypting the captured content while the second device queues for routing the encrypted captured content to the first device over a network protocol and network connection with the first device.

15. The method of claim 11, wherein routing the captured content to the first device comprises transmitting the encrypted captured content to an intermediate device between the first device and the second device, wherein the intermediate device asynchronously, and either directly or indirectly, communicates with the first device and the second device.

16. The method of claim 1, wherein securing the captured content includes the second device digitally signing the captured content prior to securely routing the secured captured content to the first device.

17. The method of claim 1, the method further comprising:
prior to securely routing the secured captured content to the first device, the second device sending a representation of the captured content to the first device; and
prior to securely routing the secured captured content to the first device, the second device receiving a second message from the first device prior to the second device routing the secured captured content to the first device, wherein the second message includes an indication of approval to proceed with the securely routing of the secured captured content.

18. A system for obtaining a content at a first device from a second device at a remote location relative to the first device, the system comprising:
the second device in asynchronous, networked communication with the first device, wherein the second device is configured to receive a first message having a capture instruction and a security component;
wherein, the second device is configured to capture the content from a peripheral of the second device; and
wherein the second device is configured to:
secure the captured content from the peripheral of the second device using at least a portion of the security component of the first message without storing the content in a persistent storage component of the second device; and
route the secured captured content to the first device over a wireless network connecting the first device and the second device without storing the content in the persistent storage component of the second device.

19. The system of claim 18, wherein the second device includes a persistent storage component and is configured to:
temporarily store, in the persistent storage, the captured content in a secure condition;
wait until a network connection is established between the first device and the second device;
after the network connection is established between the first device and the second device, route the secured captured content to the first device; and
remove the captured content in the secure condition from the persistent storage by overwriting a same location in the persistent storage.

20. The system of claim 18, wherein:
securing the captured content from the peripheral of the second device includes securing the captured content in one of: a video format frame, a portion of a video format frame, a network packet and a network packet payload with a symmetric encryption key.

* * * * *